United States Patent
Nagao

(10) Patent No.: US 8,078,449 B2
(45) Date of Patent: Dec. 13, 2011

(54) APPARATUS, METHOD AND COMPUTER PROGRAM PRODUCT FOR TRANSLATING SPEECH, AND TERMINAL THAT OUTPUTS TRANSLATED SPEECH

(75) Inventor: Manabu Nagao, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1303 days.

(21) Appl. No.: 11/723,409

(22) Filed: Mar. 19, 2007

(65) Prior Publication Data

US 2008/0077390 A1 Mar. 27, 2008

(30) Foreign Application Priority Data

Sep. 27, 2006 (JP) ................................ 2006-263116

(51) Int. Cl.
*G06F 17/20* (2006.01)
(52) U.S. Cl. ................ 704/8; 704/2; 704/251; 704/257
(58) Field of Classification Search .................. 704/2, 8, 704/251, 257
See application file for complete search history.

(56) References Cited

U.S. PATENT DOCUMENTS

| | | | | |
|---|---|---|---|---|
| 5,732,276 A * | 3/1998 | Komatsu et al. | .......... | 704/1 |
| 5,875,422 A * | 2/1999 | Eslambolchi et al. | .......... | 704/3 |
| 6,556,972 B1 * | 4/2003 | Bakis et al. | .......... | 704/277 |
| 6,859,778 B1 * | 2/2005 | Bakis et al. | .......... | 704/277 |
| 2003/0065503 A1 * | 4/2003 | Agnihotri et al. | .......... | 704/7 |
| 2005/0131709 A1 * | 6/2005 | Creamer et al. | .......... | 704/277 |
| 2006/0285654 A1 * | 12/2006 | Nesvadba et al. | .......... | 379/67.1 |
| 2007/0133437 A1 * | 6/2007 | Wengrovitz et al. | .......... | 370/260 |
| 2007/0244702 A1 * | 10/2007 | Kahn et al. | .......... | 704/260 |
| 2008/0195386 A1 * | 8/2008 | Proidl et al. | .......... | 704/235 |

FOREIGN PATENT DOCUMENTS

| | | |
|---|---|---|
| JP | 10-283356 | 10/1998 |
| JP | 2001-224002 | 8/2001 |
| JP | 2002-320037 | 10/2002 |
| JP | 2002-328921 | 11/2002 |
| JP | 2005-295015 | 10/2005 |
| JP | 2006-031448 | 2/2006 |

OTHER PUBLICATIONS

Office Action in Japanese Application No. 2006-263116 dated Nov. 25, 2008 and partial English-language translation thereof.

* cited by examiner

*Primary Examiner* — David R Hudspeth
*Assistant Examiner* — Lamont Spooner
(74) *Attorney, Agent, or Firm* — Nixon & Vanderhye, P.C.

(57) ABSTRACT

In a speech translation apparatus, a correspondence storage unit stores therein identifiers of terminals and usage languages used in the terminals associated with each other. A receiving unit receives a source speech from one of the terminals. A translating unit acquires usage languages from the correspondence storage unit, and generates a translated speech by using each of the acquired usage languages as a target language. When the translated speech is generated in any one of the target languages, a determining unit determines whether it has been generated in all the target languages. If the translated speech has been generated in all the target languages, an output unit outputs the translated speech. A sending unit sends the translated speech to each of the terminals.

21 Claims, 33 Drawing Sheets

| RECEIVING TERMINAL NUMBER | INPUT SPEECH DURATION | OUTPUT-SPEECH DURATION NUMBER | OUTPUT SPEECH | LANGUAGE INFORMATION |
|---|---|---|---|---|
| 1 | 00:12-00:20 | 1 | ∿∿ | LANGUAGE 1 |
| 1 | 00:00-00:12 | 2 | ∿∿ | LANGUAGE 1 |
| 1 | 00:20-00:25 | 3 | ∿∿ | LANGUAGE 1 |
| 1 | 00:00-00:10 | 1 | ∿∿ | LANGUAGE 2 |
| 2 | 00:00-00:11 | 1 | ∿∿ | LANGUAGE 2 |

FIG.10

DETERMINING PROCESS THROUGH THE
STEPS S903 TO S909 SHOWN IN FIG. 9
(TARGET LANGUAGE IS i)

1  foreach$(j \in L, j \neq i)$

2  $\quad X \leftarrow \{x \mid x \in I_j, S_x^j \cap S_{x_i^{next}}^i \neq 0\}$ 3  $\quad T \leftarrow \bigcup_{x \in X} S_x^j$ 4  $\quad$ if$\left(S_{x_i^{next}}^i \neq S_{x_i^{next}}^i \cap T\right)$ 5  $\quad\quad$ return false 6  $\quad x_{max} \leftarrow \max_{x \in X} x$ 7  $\quad X \leftarrow \{x \mid x_j^{next} < x \leq x_{max}\}$ 8  $\quad$ foreach$(x \in X)$ 9  $\quad\quad$ foreach$(k \in L, k \neq j)$ 10 $\quad\quad\quad T \leftarrow \bigcup_{y \in I_k} S_y^k$ 11 $\quad\quad$ if$\left(S_x^j \neq S_x^j \cap T\right)$ 12 $\quad\quad\quad$ return false 13 return true

L IS GROUP OF LANGUAGE NUMBERS $I_j$ IS GROUP OF ALL DURATION NUMBERS IN LANGUAGE j,
WHERE DURAION NUMBER STARTS FROM 1

IS x-TH DURATION IN LANGUAGE j. EQUATION $=\{s \mid t_{begin} \leq s < t_{end}, s \in \Re\}$
STANDS WHERE START POINT OF DURATION IS $t_{begin}$ AND END
POINT OF DURATION IS $t_{end}$.

$x_j^{next}$ IS DURATION NUMBER OF DURATION TO BE OUTPUT NEXT IN
LANGUAGE j AMONG $I_j$

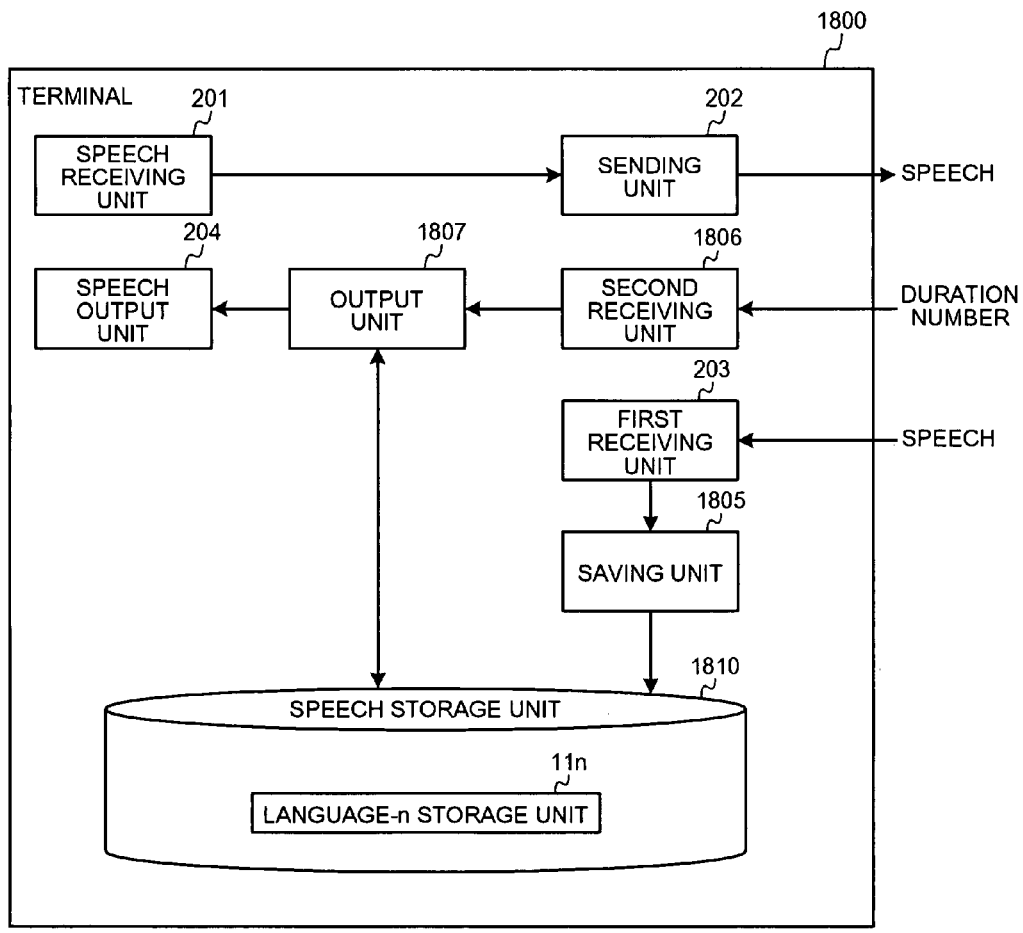

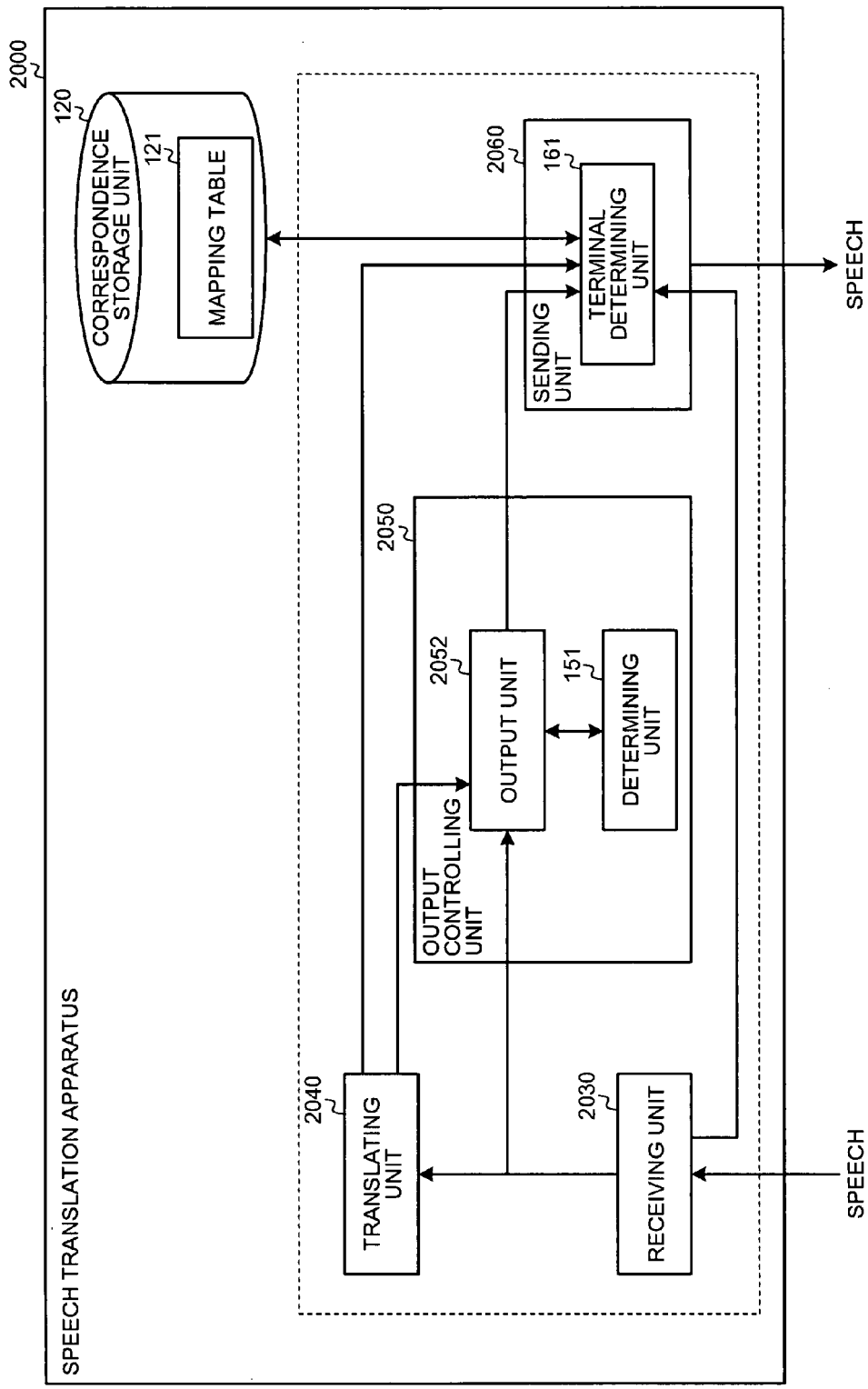

FIG.21

| RECEIVING TERMINAL NUMBER | OUTPUT-SPEECH DURATION NUMBER | OUTPUT SPEECH | LANGUAGE INFORMATION |
|---|---|---|---|
| 1 | 1 | ∿ | LANGUAGE 1 |
| 1 | 2 | ∿ | LANGUAGE 1 |
| 1 | 3 | ∿ | LANGUAGE 1 |
| 1 | 1 | ∿ | LANGUAGE 2 |
| 2 | 1 | ∿ | LANGUAGE 2 |

FIG.22

| RECEIVING TERMINAL NUMBER | INPUT SPEECH DURATION NUMBER | OUTPUT-SPEECH DURATION NUMBER | LANGUAGE INFORMATION |
|---|---|---|---|
| 1 | 00:12-00:20 | 1 | LANGUAGE 1 |
| 1 | 00:00-00:12 | 2 | LANGUAGE 1 |
| 1 | 00:20-00:25 | 3 | LANGUAGE 1 |
| 1 | 00:00-00:10 | 1 | LANGUAGE 2 |
| 2 | 00:00-00:11 | 1 | LANGUAGE 2 |

FIG.23

| RECEIVING TERMINAL NUMBER | OUTPUT-SPEECH DURATION NUMBER | LANGUAGE INFORMATION |
|---|---|---|
| 1 | 1 | LANGUAGE 1 |
| 1 | 2 | LANGUAGE 1 |
| 1 | 3 | LANGUAGE 1 |
| 1 | 1 | LANGUAGE 2 |
| 2 | 1 | LANGUAGE 2 |

FIG.28

| RECEIVING APPARATUS NUMBER | INPUT SPEECH DURATION | OUTPUT-SPEECH DURATION NUMBER | OUTPUT APPARATUS NUMBER |
|---|---|---|---|
| 1 | 00:12-00:20 | 1 | 3 |
| 1 | 00:00-00:12 | 2 | 3 |
| 1 | 00:20-00:25 | 3 | 3 |
| 2 | 00:00-00:10 | 1 | 3 |

APPARATUS, METHOD AND COMPUTER PROGRAM PRODUCT FOR TRANSLATING SPEECH, AND TERMINAL THAT OUTPUTS TRANSLATED SPEECH

CROSS-REFERENCE TO RELATED APPLICATIONS

This application is based upon and claims the benefit of priority from the prior Japanese Patent Application No. 2006-263116, filed on Sep. 27, 2006; the entire contents of which are incorporated herein by reference.

BACKGROUND OF THE INVENTION

1. Field of the Invention

The present invention generally relates to a technology for providing an apparatus, a method and a computer program product for translating speeches, and a terminal apparatus for outputting translated speeches.

2. Description of the Related Art

With advanced information technology, electronic conference systems have been widely used to communicate with a plurality of participants in a conference, a meeting, and the like. The electronic conference systems include a video conference system that provides speeches and images of the participants as well as a telephone conference system that conveys speeches of the participants.

If the participants use different languages, a speech translation technology that recognizes and translates a speech is used to share a speech of each participant with others.

However, when the speech translation technology is applied to the video conference system, an image and a translated speech of a speaker are not output in synchronization because it takes a certain time to process the speech.

JP-A 2001-224002 (KOKAI) discloses a technology that translates speech signals, performs time-scale compression/decompression on image signals received with the speech signals so that a duration of the image signals is equal to a duration of a synthesized speech after translation, and outputs the processed image signals and the synthesized speech at the same time.

The technology disclosed in JP-A 2001-224002 (KOKAI) eliminates a time lag between the translated speech and the moving image; however, it does not eliminate the time lag among the translated speech and the moving image output for the participants in the teleconference. In other words, if a speech is translated into a plurality of target languages, the translated speeches can be output at different timings depending on the target language because the process of the translation and the output order of the translated words vary.

Moreover, participants that use the same language as the speaker hear the speech in real time and others have to wait for the speech until it is translated. Therefore, it is sometimes difficult for the participants that listen to the translated speech to keep up with the conference.

SUMMARY OF THE INVENTION

According to one aspect of the present invention, a speech translation apparatus includes a correspondence storage unit that stores identifiers to uniquely identify each of a plurality of terminals connectable via a network and usage languages used in the terminals associated with each other; a receiving unit that receives a source speech from one of the terminals; a translating unit that acquires the usage languages different from a source language used in the source speech from the correspondence storage unit, and generates a translated speech translated from the source speech by using each of the acquired usage languages as a target language; a determining unit that determines whether the translated speech has been generated in all of the target languages when the translated speech is generated in any one of the target languages; an output unit that outputs the translated speech when the translated speech has been generated in all of the target languages; and a sending unit that sends the translated speech to each of the terminals identified by the identifier corresponding to the target language.

According to another aspect of the present invention, a terminal includes a speech receiving unit that receives a source speech; a sending unit that sends the source speech to a speech translation apparatus connectable via a network for translating the source speech and generating a translated speech; a first receiving unit that receives the translated speech from the speech translation apparatus; a speech output unit that outputs the translated speech; a second receiving unit that receives an estimated time to complete translation of the source speech from the speech translation apparatus; and a display unit that displays the estimated time.

According to still another aspect of the present invention, a speech translation apparatus includes a correspondence storage unit that stores identifiers to uniquely identify each of a plurality of terminals connected via a network and usage languages used in the terminals associated with each other; a receiving unit that receives a source speech from one of the terminals; a translating unit that acquires the usage languages different from a source language used in the source speech from the correspondence storage unit, and generates a translated speech translated from the source speech by using each of the acquired usage languages as a target language; a sending unit that sends the translated speech to each of the terminals identified by the identifier corresponding to the target language and sends the source speech to each of the terminals identified by the identifier corresponding to the source language; a determining unit that determines whether the translated speech has been generated in all of the target languages, when the translated speech is generated in any one of the target languages; and an output unit that outputs duration information of a speech duration of the source speech determined by the determining unit, when the translated speech has been generated in all of the target languages, wherein the sending unit further sends the duration information to the terminals.

According to still another aspect of the present invention, a terminal includes a speech storage unit that is capable of storing a mixed speech that includes the translated speeches or the source speeches; a speech receiving unit that receives a source speech; a sending unit that sends the input source speech to a speech translation apparatus connectable via a network, the speech translation apparatus translating the source speech and generating a translated speech; a first receiving unit that receives the translated speech from the speech translation apparatus; a saving unit that mixes the translated speech with the mixed speech in the speech storage unit to generate a resulting mixed speech and stores a resulting mixed speech in the speech storage unit; a second receiving unit that receives duration information on a speech duration of the source speech from the speech translation apparatus; and an output unit that outputs the resulting mixed speech corresponding to the speech duration specified by the duration information acquired from the speech storage unit.

According to still another aspect of the present invention, a speech translation apparatus includes a language storage unit that stores usage languages; a first receiving unit that receives a source speech from a plurality of other speech translation apparatuses connectable via a network; a translating unit that generates a translated speech translated from the source speech by using each of the usage languages stored in the language storage unit as a target language; a second receiving unit that receives information indicating that the source speech has been translated into a language used in another speech translation apparatus therefrom; a determining unit that determines whether the translated speech has been generated in all of the other speech translation apparatuses, when the information is received from any one of the other speech translation apparatuses; and an output unit that outputs the translated speech when the translated speech has been generated in all of the other speech translation apparatuses.

According to still another aspect of the present invention, a speech translation method includes receiving a source speech from a plurality of terminals connectable via a network; acquiring the usage languages different from a source language used in the source speech from a correspondence storage unit that stores identifiers to uniquely identify each of a plurality of terminals and usage languages used in the terminals associated with each other; generating a translated speech translated from the source speech by using each of the usage languages acquired as a target language; determining whether the translated speech has been generated in all of the target languages when the translated speech is generated in any one of the target languages; outputting the translated speech when it is determined that the translated speech has been generated in all of the target languages; and sending the translated speech to each of the terminals identified by the identifier corresponding to the target language.

A computer program product according to still another aspect of the present invention causes a computer to perform the method according to the present invention.

BRIEF DESCRIPTION OF THE DRAWINGS

FIG. 10 is an explanatory diagram showing an example of pseudo codes indicative of the determining process;

FIG. 18 is a block diagram of a terminal according to a third embodiment of the present invention;

FIG. 19 is an explanatory diagram showing an example of information received by a first receiving unit shown in FIG. 18;

FIG. 20 is a block diagram of a speech translation apparatus according to the third embodiment;

FIGS. 21 to 23 are examples of information output from a translating unit shown in FIG. 20;

FIG. 28 is an explanatory diagram showing an example of information output from a translating unit shown in FIG. 27;

DETAILED DESCRIPTION OF THE INVENTION

Exemplary embodiments of the present invention are explained below in detail referring to the accompanying drawings.

A speech translation apparatus 100 according to a first embodiment stores therein durations of translated speeches until a speech in a predetermined speech duration is fully translated, and outputs the translated speech when the speech is translated into all languages.

The translated speech is a speech generated by translating received speech and speech-synthesizing the resulting speech. The speech duration is a duration of the received speech or the translated speech output from the speech translation apparatus. To define a start point and an end point of the speech duration, for example, a time passed since the speech translation apparatus started, to operate is used. Otherwise, the speech translation apparatus can be configured to use Greenwich Mean Time.

The speech duration is represented as [x,y), which means that x is the start point and y is the end point. The symbol "[" means that x immediately after it is included in the speech duration, and the symbol ")" means that y immediately before it is not included in the speech duration.

As contrasted with the speech duration, there is a non-speech duration, which is a duration of a speech that is not translated in the sound received by the speech translation apparatus. The non-speech duration generally includes silence or noises.

In the sound received by the speech translation apparatus, the speech duration used for the speech translation can be referred to as an input speech duration, and the speech duration of the translated speech is referred to as an output speech duration.

The received speech can be referred to as a source speech and a source speech of the output speech. The terms are used because the output speech can include the received speech without being translated for participants that use the same language as the speaker speaks. Therefore, the output speech includes the translated speech and the source speech.

Figure 1:
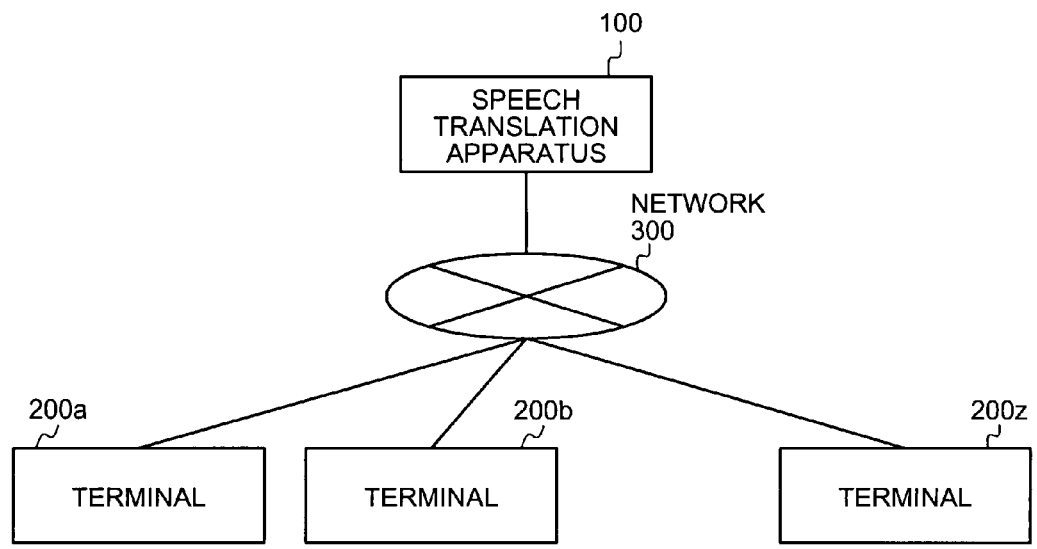
FIG. 1 is a schematic view of a conference system according to a first embodiment of the present invention.

As shown in FIG. 1, the conference system includes the speech translation apparatus 100 and a plurality of terminals 200a, 200b, and 200z (each one is also referred to as a terminal 200) connected via a network 300.

The terminal 200 is provided to each participant. It receives source speeches and outputs translated speeches. The network 300 can be any one of a telephone line, the Internet, a wireless network and the like that can transmit speech data.

A speech translating process according to the first embodiment is outlined below. It is an object of the first embodiment to eliminate the time lag for the participants in the teleconference as well as the time lag between the translated speech and the moving image.

Such a phenomenon occurs under the following conditions; (1) there are three or more participants, (2) at least one of the participants speaks a different language, (3) the translation causes a delay due to linguistic restriction and throughput, and (4) speeches of the participants can be heard only through the speech translation apparatus 100.

For example, there are three participants, and one of them speaks a different language. Participants that speak a language A are referred to as A1 and A2, and a participant that speaks a different language B is referred to as B1. When A1 speaks through the terminal 200a, his/her speech is sent to the speech translation apparatus 100 via the network 300.

The speech is not immediately transferred to A2 and stored for a while, though it does not need to be translated. The speech to be transferred to B1 is translated and converted into a speech in the language B. After the conversion is completed, the source speech is transferred to A2 and the translated speech is transferred to B1.

The same method applies to a case in which all participants speak different languages. For example, the three participants A1, B1, and C1 speak different languages A, B, and C. When a participant A1 speaks through the terminal 200a, the speech translation apparatus 100 receives the speech and translates it into the languages B and C. However, the conversions are not completed at the same time. Therefore, the speech translation apparatus 100 stores therein a translated speech until another conversion is completed, and the translated speeches are output when all the translated speeches from the same source speech are ready.

As described above, even if the speech can be output for one of the participants, it is not output until the speech is ready to be output for all of the participants. In this manner, the time lag to output the speech to each participant is minimized so that the participants can keep up with the conference.

Figure 2:
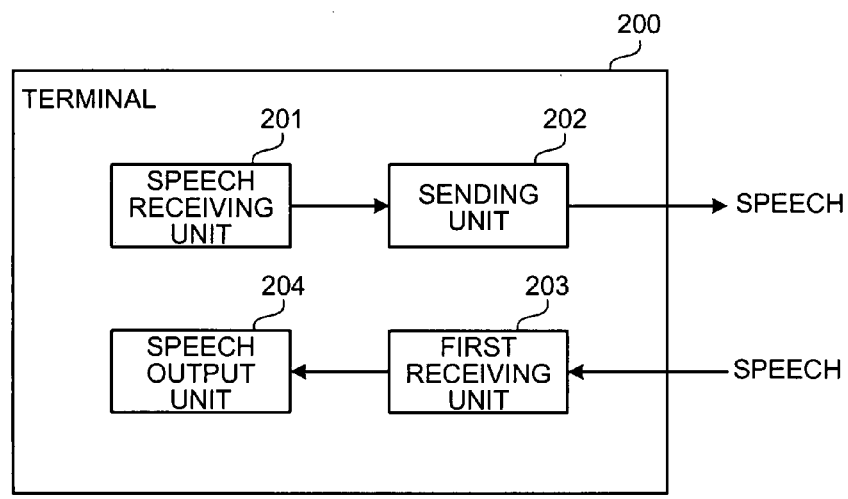
FIG. 2 is a block diagram of a terminal according to the first embodiment.

As shown in FIG. 2, the terminal 200 includes a speech receiving unit 201, a sending unit 202, a first receiving unit 203, and a speech output unit 204.

The speech receiving unit 201 converts a received speech into electrical signals, which is also referred to as speech data, and transfers the speech data to the sending unit 202. Hereinafter, the speech data is referred to simply as a speech. The speech receiving unit 201 can be a commonly used microphone or the like.

The sending unit 202 sends the speech received by the speech receiving unit 201 to the speech translation apparatus 100. The first receiving unit 203 receives the translated speech generated by the speech translation apparatus 100 or the source speech from the speech translation apparatus 100.

The speech output unit 204 outputs the speech that the first receiving unit 203 receives, and it can be a commonly used loudspeaker or the like. The speech receiving unit 201 and the speech output unit 204 can be integrated like a telephone set or a headset.

Figure 3:
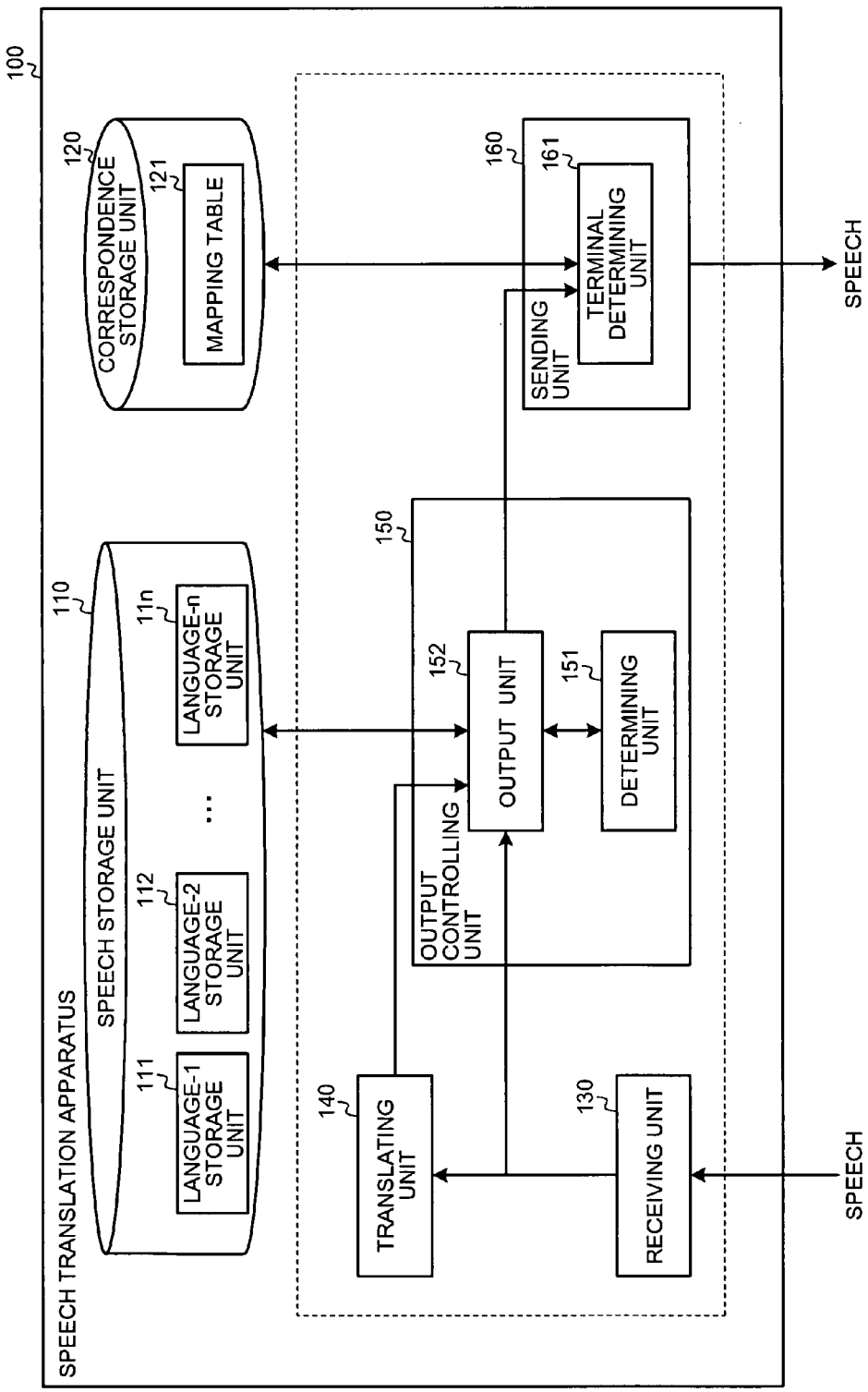
FIG. 3 is a block diagram of a speech translation apparatus according to the first embodiment.

As shown in FIG. 3, the speech translation apparatus 100 includes a speech storage unit 110, a correspondence storage unit 120, a receiving unit 130, a translating unit 140, an output controlling unit 150, and a sending unit 160.

The speech storage unit 110 stores therein speeches received from the terminals 200 with respect to each language. The speech storage unit 110 includes storage subunits to store the speeches with respect to each language, such as a language-1 storage unit 111, a language-2 storage unit 112, . . . , and a language-n storage unit 11n.

The correspondence storage unit 120 stores therein information on each terminal 200 associated with the language that the terminal 200 uses. The correspondence storage unit 120 stores therein a mapping table 121 that associates an identifier that uniquely identifies the terminal with the language to be used in the terminal 200.

The mapping table 121 includes the identifier and the language sent from the terminal 200 when it is connected to the speech translation apparatus 100 via the network 300.

The speech storage unit 110 and the correspondence storage unit 120 can be any commonly used recording medium such as a hard disk drive (HDD), an optical disk, a memory card, or a random access memory (RAM).

The receiving unit 130 receives the speech from the terminal 200 via the network 300. The receiving unit 130 receives the identifier of the terminal 200 that accompanies the speech. The receiving unit 130 transfers the speech and the identifier to the translating unit 140 and the output controlling unit 150. The speech is transferred to the output controlling unit 150 because it is sent to the terminal 200 as it is if the terminal 200 uses the same language as the source speech.

The translating unit 140 performs speech translation among all the languages that the speech translation apparatus 100 uses. For example, if the speech translation apparatus 100 uses Japanese, English, and Chinese, it translates between Japanese and English, between English and Chinese, and between Chinese and Japanese.

The translating unit 140 generates the translated speech by performing a speech recognition process, a machine translation process, and a speech synthesis process. The speech recognition process includes recognizing a received speech and converts it into character strings. The machine translation process includes translating the character strings into a target language. The speech synthesis process includes generating a translated speech by synthesizing the character strings translated into the target language.

The speech recognition process can employ any speech recognition technique that uses a longitudinal parity check, a hidden Markov model (HMM), a dynamic programming, a neural network, an N-gram language model, and the like.

The machine translation process can employ any translation technique such as a transfer method, an example-based translation, a statistic-based translation, or an interlingual method.

The speech synthesis process can employ any speech synthesis technique such as a speech segment compilation synthesis, a formant synthesis, a speech-corpus-based synthesis, or text-to-speech synthesis.

The translating unit 140 associates the translated speech with information regarding the input speech duration and outputs the speech. The translating unit 140 uses any conventional technique to detect the speech duration such as a technique that determines a duration during which a sound is detected for a relatively longer time than a predetermined threshold to be a speech duration.

Figures 4, 5:
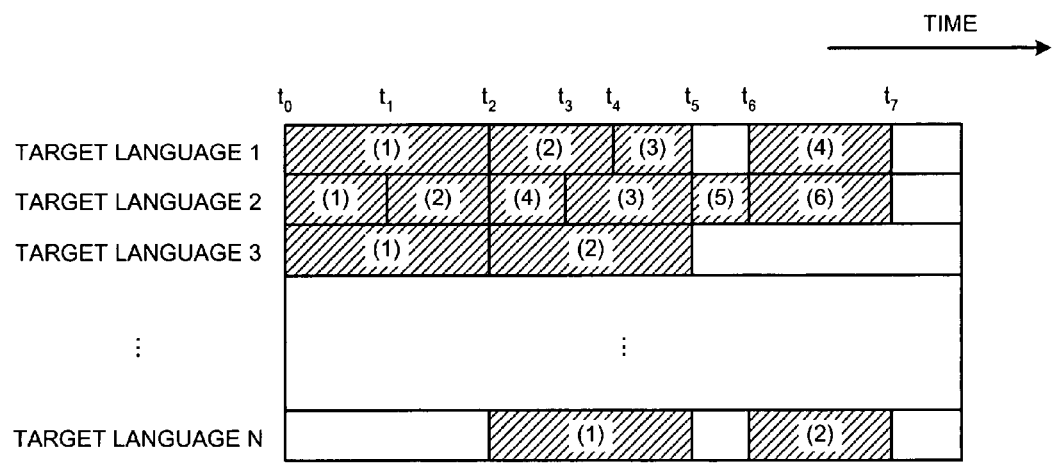
FIG. 4 is an explanatory diagram showing an example of information output from a translating unit shown in FIG. 3.
FIG. 5 is an explanatory diagram showing an example of a speech in a speech storage unit shown in FIG. 3.

As shown in FIG. 4, information output from the translating unit 140 includes a receiving terminal number indicative of the identifier of the terminal that receives the source speech, an input speech duration, an output-speech duration number, an output speech, and language information.

The receiving terminal number is received from the receiving unit 130 along with the speech, and it is set to the information as is received. The output-speech duration number is a number that identifies the speech duration of the translated speech to be output, and serial numbers are applied with respect to each language and each receiving terminal number.

The output speech shown in FIG. 4 indicates the data of the output speech, which is schematically expressed as a waveform. The language information is used to identify the target language of the translation. It is indicated by numbers in FIG. 4; however, it can be indicated by the language name such as English.

Relation between the input speech duration and the output speech duration is explained below. As a general rule, the translating unit 140 generates a translated speech with the same length as the source speech. This does not mean that each input speech duration needs to match the corresponding output speech duration. In other words, a plurality of the input speech durations needs only to match the duration of the translated speech that corresponds to the input speech durations.

Therefore, length of an input speech duration as a source of translation into a certain language can differ from that of an input speech duration as a source of translation into another language. However, the input speech duration needs to be delimited at some point common to all of the languages.

FIG. 5 is an explanatory diagram showing an example of the speech in each language delimited into each speech duration. A symbol $t_n$ on the horizontal axis, where n is an integer, indicates a time point at which the speech duration starts, a number in parentheses indicates the order of outputting the output speech duration in each language, and N indicates the total number of the languages used.

In FIG. 5, though a second output speech duration in a language 1 and a fourth output speech duration in a language 2 start at a same start point $t_2$, they end at different end points ($t_3$, $t_4$). On the other hand, there are always speech durations that end at the same end point like a third speech duration in the language 1 and a third speech duration in the language 2.

For example, because the same source speech is used, the speech duration of the source speech during which the speaker is speaking is common to all target languages. Therefore, at least the start point of the speech and the end point of the speech are common to all of the target languages. Moreover, the end point can be common, for example, at a point where a punctuation mark can be inserted.

The translating unit 140 sends the non-speech duration to the output controlling unit 150 as it is without processing it. The translating unit 140 assigns a duration number to the non-speech duration, and the non-speech duration is not discriminated from a speech generated by the speech translation in the following processes unless otherwise specified. If the non-speech duration is relatively long, the translating unit 140 divides it into sufficiently small durations, and assigns a number to each duration so that the non-speech duration can be output as early as possible.

As described above, the translating unit 140 generates the translated speech with the same length as the received speech at a certain duration. Without this condition, one terminal 200 completes output of the translated speech while another terminal 200 is still outputting the translated speech.

The certain duration is not necessarily a fixed time duration; it can be a single speech duration, or a combination of speech durations.

To satisfy the condition, the translating unit 140 adjusts the length of the speech when it synthesizes the translated speech. More specifically, the translating unit 140 controls the rate of the synthesized speech so that the durations of the translated speeches in different languages are equal.

The translating unit 140 can be configured to adjust the length of the speech by inserting silence before or after the speech. For example, if the synthesized speech is shorter, the translating unit 140 inserts the silence at least one of before and after the speech. If the synthesized speech is longer, the translating unit 140 includes some of the non-speech durations in the input speech duration to extend the duration of the source speech so that the translated speeches in different languages can have the same length.

The output controlling unit 150 controls a timing to output the speech, and includes a determining unit 151 and an output unit 152.

The determining unit 151 determines, when the translating unit 140 generates information on the translated speech, whether the translated speech in each speech duration is generated in all of the languages, whereby determining whether the translated speech can be output. The determining process performed by the determining unit 151 will be explained later.

The output unit 152 outputs the translated speech and the source speech that corresponds to the speech duration for which the translated speech is generated in all the languages.

The sending unit 160 sends the speech output from the output unit 152 to the terminals 200, and includes a terminal determining unit 161.

The terminal determining unit 161 determines which one of the terminals 200 to send the speech in each language to by referring to the mapping table 121. More specifically, the terminal determining unit 161 acquires the identifier of the terminal 200 that corresponds to each language from the mapping table 121, and determines the terminal 200 that corresponds to the acquired identifier as a destination.

Figure 6:
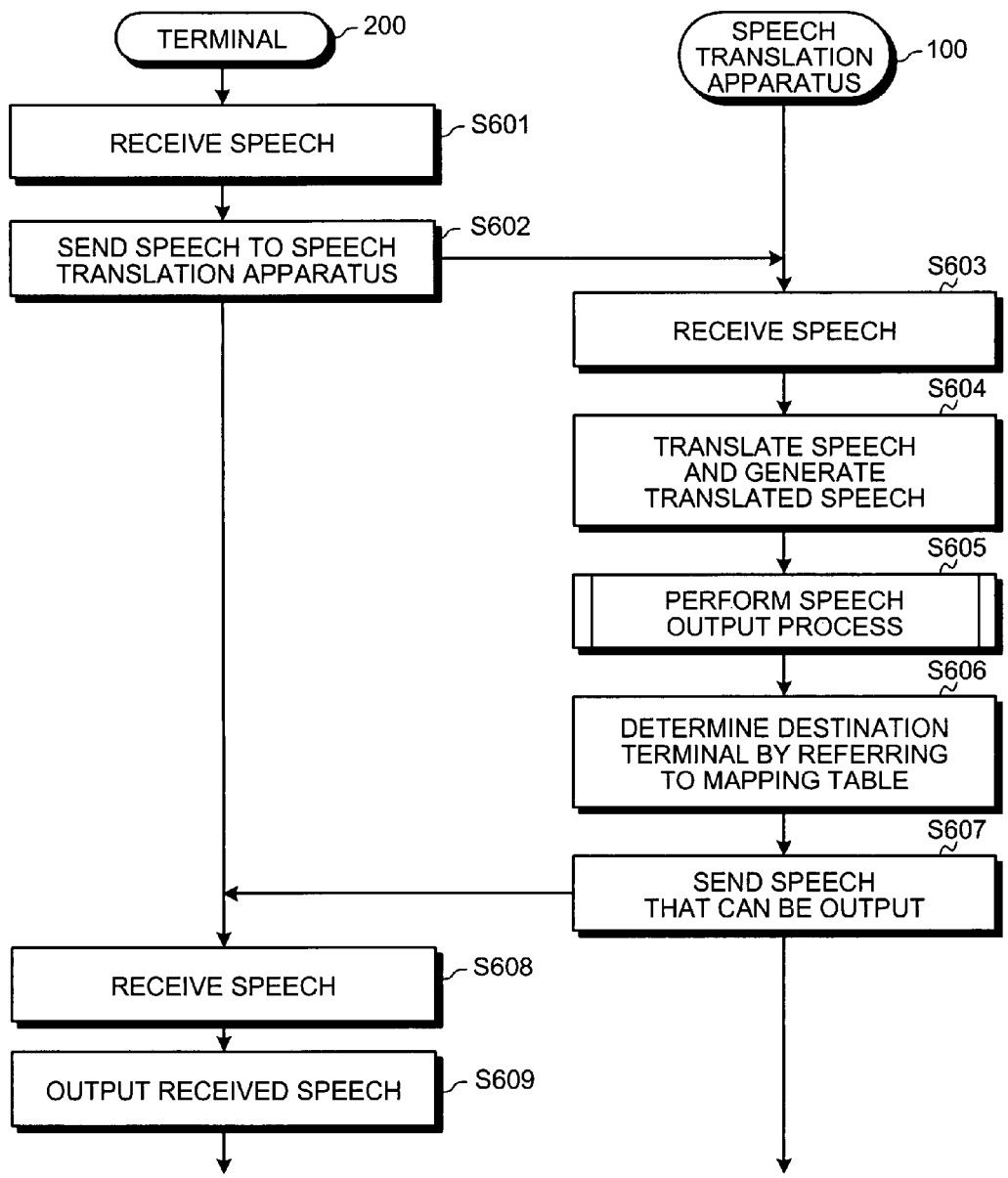
FIG. 6 is a sequence diagram of a speech translating process according to the first embodiment.

A speech translating process performed by the speech translation apparatus 100 according to the first embodiment is explained referring to FIG. 6.

Although FIG. 6 shows the transmission of the speech between a single terminal 200 and the speech translation apparatus 100, the process is actually performed between a plurality of the terminals 200 and the speech translation apparatus 100.

The speech receiving unit 201 in the terminal 200 receives a source speech (step S601). The sending unit 202 sends the source speech to the speech translation apparatus 100 (step S602).

The receiving unit 130 in the speech translation apparatus 100 receives the source speech (step S603). The translating unit 140 translates the received source speech, and generates the translated speech (step S604).

The output controlling unit 150 determines the timing to output the speech translated from the source speech, and performs a speech output process to output the speech that can be output (step S605). The speech output process will be explained later in detail.

The terminal determining unit 161 determines the terminal 200 to which the translated speech in each language is sent by referring to the mapping table 121 (step S606).

In FIG. 6, it is assumed that the speech duration to be output is detected during the speech output process. However, if the speech duration that can be output is not present, steps 606 and after are not performed.

The sending unit 160 sends the speech that can be output to each terminal 200 (step S607).

The first receiving unit 203 in the terminal 200 receives the speech from the speech translation apparatus 100 (step S608), and the speech output unit 204 outputs the received speech (step S609).

As described above, the terminals 200 send all the source speeches to the speech translation apparatus 100, receives the speech to be output with the output timing adjusted by the speech translation apparatus 100, and outputs the adjusted speech. Therefore, the translated speeches of an identical source speech can be output from each of the terminals 200 with a less time lag.

Figure 7:
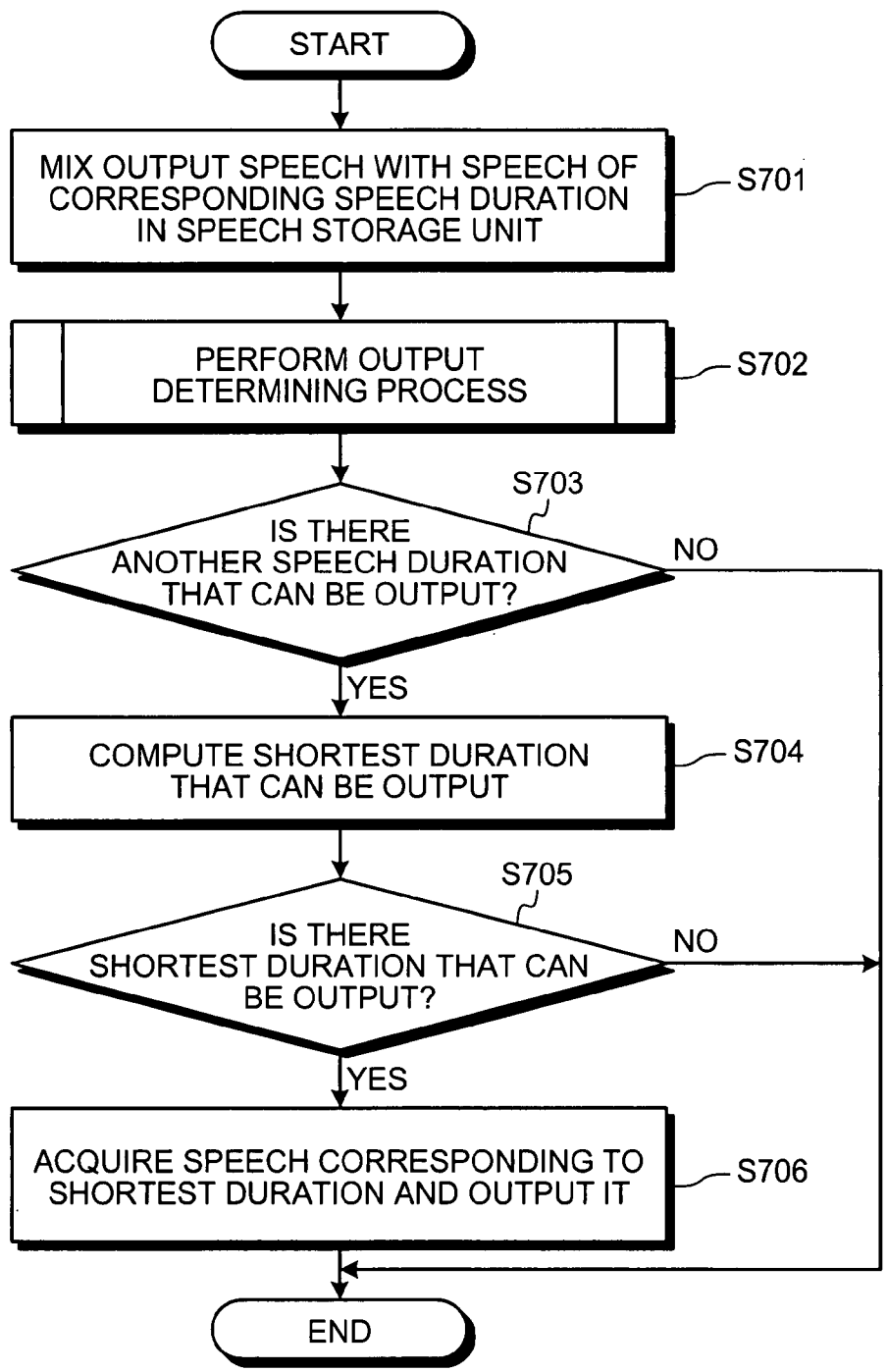
FIG. 7 is a flowchart of a speech output process.

The speech output process at the step S605 is detailed referring to FIG. 7.

The output unit 152 stores the speech output from the translating unit 140 in the speech storage unit 110. If the speech storage unit 110 has already stored therein another speech, it stores therein a mixed speech that includes a mixture of the existing speech and the speech output from the translating unit 140 (step S701) because the speech translation apparatus 100 can receive speeches from a plurality of the terminals 200 at the same time.

In other words, if there is no speech is in the speech storage unit 110 in the speech duration corresponding to the output speech, the output unit 152 outputs the speech as it is. If any speech is included in the speech storage unit 110 in the speech duration, the output unit 152 acquires the speech, generates the mixed speech, and stores the mixed speech as the speech corresponding to the speech duration.

When the output speech includes both of a speech duration that includes no speech and a speech duration that includes any speech, the output unit 152 determines that the speech duration without speech is silent.

The output unit 152 refers to the language information in the information output from the translating unit 140 and stores the speech in the corresponding storage unit 11n.

The output unit 152 performs a determining process to determine the speech duration that can be output (step S702). The determining process will be detailed later.

The output unit 152 determines whether there is another speech duration that can be output (step S703). If such a speech duration is not present (NO at step S703), the output unit 152 terminates the speech output process.

If such a speech duration is present (YES at step S703), the output unit 152 computes the shortest duration that can be output (step S704). In other words, if the speech translation apparatus 100 receives speeches from a plurality of terminals 200 at the same time and there is a plurality of corresponding output speeches, the output unit 152 computes the output speech duration so that a duration for which the output speeches in all the languages are ready is output at first.

Figure 8:
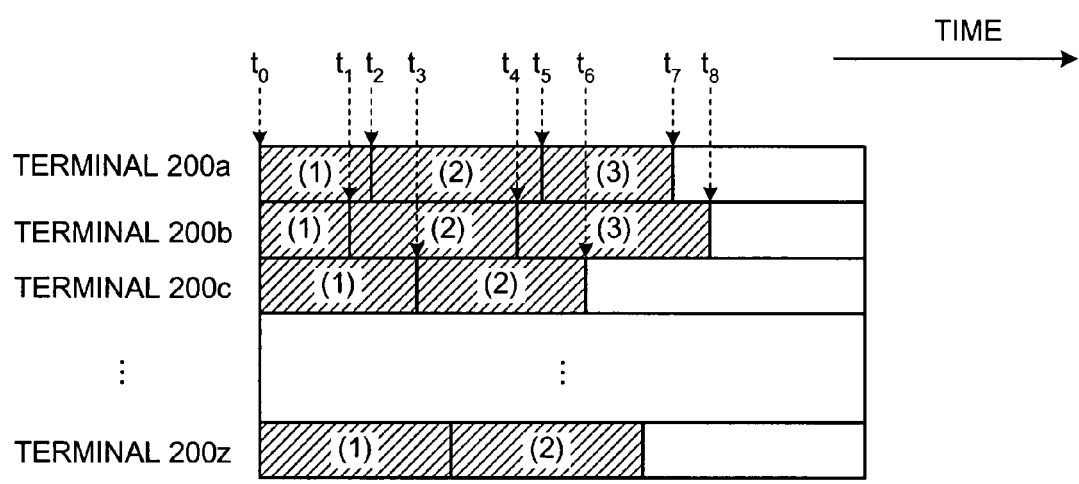
FIG. 8 is an explanatory diagram showing an example of a speech duration to be output to each terminal.

The process to compute the shortest duration is explained referring to FIG. 8. Shadowed areas indicate the output speech durations, and numbers in the output speech durations indicate the output-speech duration numbers. FIG. 5 is different from FIG. 8 because the shadowed areas indicate the input speech durations in FIG. 5.

Because users of the terminals 200 speak at different timings, the output speech durations rarely match. Therefore, a delay can be inserted in the middle of a speech duration. However, the delay is not inserted into any non-speech duration except at a delimited point unless two or more persons speak at a time, because translation process is not performed on the non-speech duration and the delay due to the translation process does not occur. Therefore, in this case, the output speech does not pause.

It is assumed here that output speeches with the output-speech duration number 1 are output for all the terminals 200. The output unit 152 computes a speech duration of the output speech that ends at first to determine the shortest duration. In FIG. 8, the output unit 152 computes a duration between to and $t_1$ as the shortest duration.

If an output speech with the output-speech duration number 2 for a terminal 200c is then output, the oldest end point is still $t_1$, and the shortest duration does not change. As described later, it is determined in this case that the shortest duration that can be output is not present, and no speech is newly output at this point.

If an output speech with the output-speech duration number 2 for the terminal 200b is output then, the oldest end point at this point is $t_2$, and a duration before $t_2$ is computed as the shortest duration.

After the shortest duration is computed at the step S704, the output unit 152 determines whether there is a shortest duration that can be output (step S705). If such a shortest duration is not present (NO at step S705), the output unit 152 terminates the speech output process.

If such a shortest duration is present (YES at step S705), the output unit 152 acquires the speech corresponding to the shortest duration from the speech storage unit 110 and outputs it (step S706).

In this manner, the output speech can be output in order starting from the duration for which the output speech is generated for all of the terminals 200. If the output of the speech delays while waiting for the speech for all of the terminals 200, no speech is output during the delay. Instead of outputting no speech, silence data can be added to the speech data to be output. On the contrary, if another speech to be output next is generated during output of the current speech, the other speech is output after the output of the current speech is completed.

Figure 9:
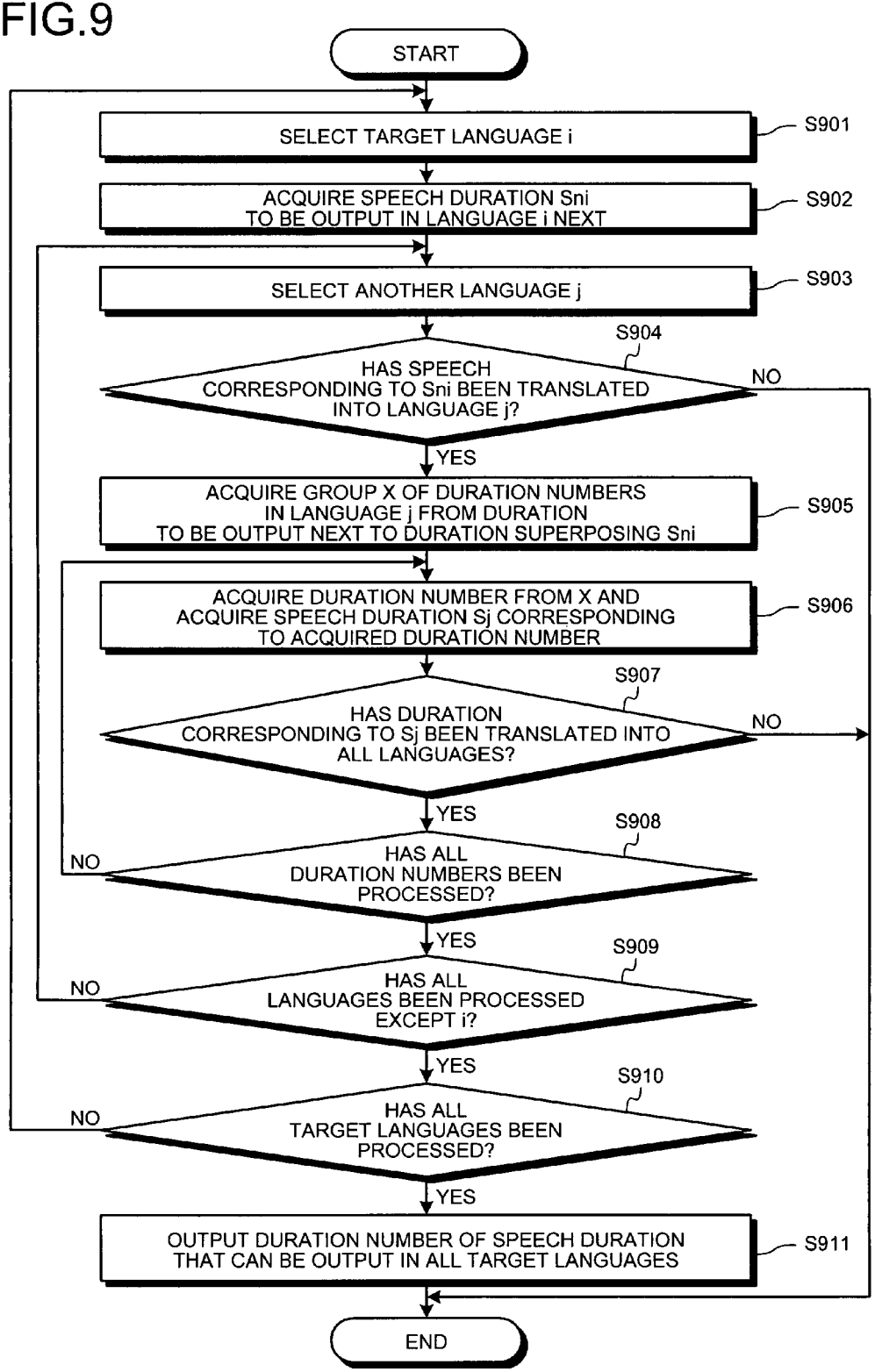
FIG. 9 is a flowchart of a determining process performed by a determining unit shown in FIG. 3.

The determining process at the step S703 is detailed referring to FIG. 9.

The determining unit 151 selects one of the target languages (hereinafter, "language i") (step S901). The determining unit 151 acquires a speech duration to be output in the language i (hereinafter, "duration Sni") (step S902).

For example, if the speech shown in FIG. 5 is stored in the speech storage unit 110 and speech durations with the output orders 1 and 2 in the language 2 have been output, a speech duration between $t_3$ and $t_5$ is to be output next.

The determining unit 151 selects another language j (step S903), and repeats the process to a step S908 for all the target languages.

The determining unit 151 determines whether the speech corresponding to Sni has been translated into the language j (step S904). If it has not been translated (NO at step S904), the determining unit 151 terminates the determining process.

If it has been translated (YES at step S904), the determining unit 151 acquires output-speech duration numbers of speech durations in the language j from the duration to be output next to the duration that superposes Sni. The acquired output-speech duration numbers is referred to as a group X (step S905).

The step S905 is performed to determine whether translated speeches in other languages have been generated for each speech duration to be output, if there is any speech duration to be output before the speech duration in the language j that superposes Sni. In this manner, even if the speech duration that superposes Sni has been translated, it cannot be output unless the speech duration to be output before it is translated.

The determining unit 151 acquires one duration number from the group X, and acquires a speech duration Sj that corresponds to the acquired duration number (step S906). The determining unit 151 determines whether the duration corresponding to Sj has been translated into all the other languages (step S907).

If the duration has not been translated into any language (NO at step S907), the determining unit 151 terminates the determining process because the translation has not completed in all the languages. If the duration has been translated into all the languages (YES at step S907), the determining unit 151 determines whether all the duration numbers have been processed (step S908).

If not all of the duration numbers have been processed (NO at step S908), the determining unit 151 acquires another duration number and repeats the process (step S906). If all of the duration numbers have been processed (YES at step S908), the determining unit 151 determines whether all the languages have been processed except the language i (step S909).

If not all of the languages except the language i have been processed (NO at step S909), the determining unit 151 acquires another language as the language j and repeats the process (step S903).

If all of the languages have been processed except the language i (YES at step S909), the determining unit 151 determines whether all the target languages have been processed (step S910). If not all of the target languages have been processed (NO at step S910), the determining unit 151 acquires another target language as the language i, and repeats the process (step S901).

If all of the target languages have been processed (YES at step S910), the determining unit 151 outputs the duration number of the speech duration that can be output in all of the target languages (step S911), and terminates the determining process.

An example of the determining process is explained referring to FIGS. 10 to 14.

In the example, the speech received by the terminal 200 is Japanese, and the terminals 200 that output the translated speech use Japanese and English respectively. Japanese is the language 1, and English is the language 2. A Japanese speech that means "Where is Tokyo station?" is received by the terminal 200.

The input Japanese speech is input to the output controlling unit 150 and the translating unit 140. When the output controlling unit 150 receives the input speech, the speech storage unit 110 stores therein an output speech as shown in FIG. 11, where $t_{end}$ is the time of the end point of the duration of the input speech.

Figure 11:
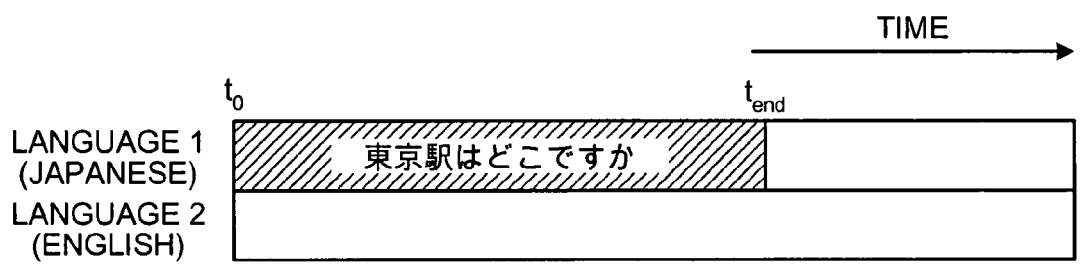
FIGS. 11 to 14 are examples of contents of the speech storage unit.

Although only a single duration is shown in FIG. 11, the determining process is performed assuming that the speech is divided into sufficiently small durations. The sufficiently small duration is, for example, a duration of a single sample of a sampled speech. If the speech is sampled at 11 kilohertz, it is a duration of an eleven-thousand per second. Associated durations can be combined at the time point that the translating unit 140 outputs the information of the speech duration.

The translating unit 140 outputs the translated speech to the output controlling unit 150 every time the speech is translated and the synthesized speech is generated. It is assumed here that a translated English speech "where is" is output from the translating unit 140 at first.

Figure 12:
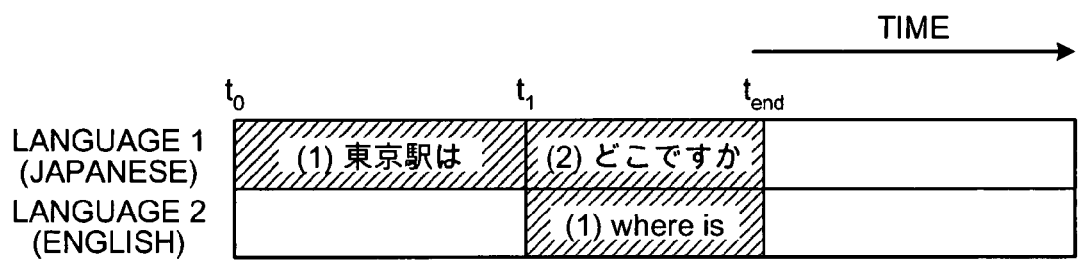

Because the input speech duration used to generate "where is" is also output, the output unit 152 stores "where is" in the duration corresponding to the input speech duration. The contents of the speech storage unit 110 in this state are shown in FIG. 12.

Although Japanese durations can be processed as divided into smaller durations, they are combined to match the English durations with the numbers assigned thereto. The Japanese durations are small enough to be combined into same durations as the English ones without mismatching start points and end points of the durations.

In this state, as shown in FIG. 9, the determining process is performed based on i=1, i.e., in Japanese (the language 1). The determining process is explained below using pseudo codes shown in FIG. 10. The pseudo codes correspond to the steps S903 to S909 shown in FIG. 9.

Because Japanese and English are used, an equation L={1, 2} stands. L is a group of numbers of all the languages used in the translation process. A first line indicates that the processes from a second line to a twelfth line are repeated for all of L except i.

In this example, the processes are performed only on j that is 2. In the second line, a duration number of a duration of the language 2 (English) that superposes a duration of the language 1 is substituted for X. In this case, X={ }, i.e., X is empty.

In a third line, a duration of the number included in X is substituted for T, which is empty. In a fourth line, an intersection of a duration $x_1^{next}$ and T is also empty, which is not equal to the duration $x_i^{next}$, and the conditional statement is satisfied. As a result, a fifth line is executed, the determining unit 151 determines that the speech cannot be output, and the determining process is terminated.

Figure 13:
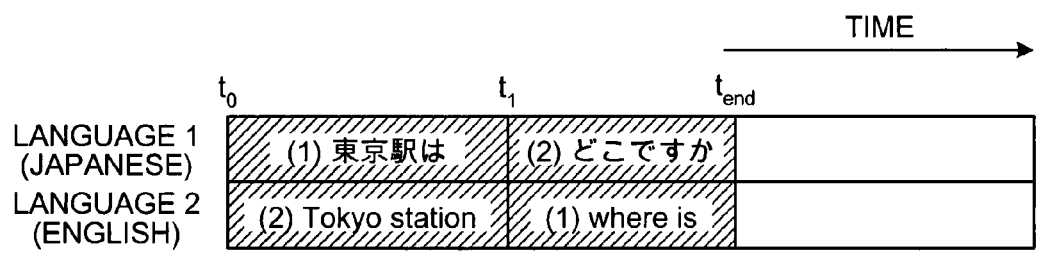

Another translated English speech "Tokyo station" is output from the translating unit 140. The contents of the speech storage unit 110 in this state are shown in FIG. 13.

The determining process is performed on the language 1 again. The first line of the pseudo codes is same as described above.

In the second line, because there is a duration number 2 of the duration in the language 2 that superposes the duration in the language 1, an equation X={2} stands.

In the third line, the duration of $[t_0, t_1)$ is substituted for T. Because i is 1, the duration $x_i^{next}$ to be output next in the language 1 is expressed as $x_1^{next}=1$. This means that the first speech duration (i=1) is to be output next because no speech has been output in the language 1.

Because the first duration in the language 1 $S_1^1$ includes the duration $[t_0, t_1)$, the fourth line is determined to be false, and the process moves to a sixth line. A maximum value of the numbers in X is acquired in the sixth line, where $x_{max}$ is equal to 2.

When X is updated in a seventh line, an only integral that satisfies $1<x\leq 2$ is 2 based on $x_j^{next}=x_2^{next}=1$ Therefore, an equation $X=\{2\}$ stands.

An eighth line indicates that the processes from a ninth line to the twelfth line are repeated for all of the numbers in X. In this example, the processes are performed only on $x=2$.

The ninth line indicates that the processes from a tenth line to the twelfth line are repeated for all the languages except the language j. In this example, the processes are performed only on $k=1$.

In the tenth line, all the durations in a language k are substituted for T, which includes the duration $[t_0,t_{end})$.

In an eleventh line, it is determined whether an x-th duration in the language j is filled with the durations of T. Because j is equal to 2 and x is equal to 2, an equation $S_x^j=S_2^2=[t_0,t_1)$ stands. On the other hand, because the duration of T is $[t_0, t_{end})$, it includes the duration of $[t_0,t_1)$. Thus, the condition of the eleventh line is not satisfied.

To complete all loops, the process moves to a thirteenth line and true is returned. Now that the determination process has been performed on $i=1$, i.e., the language 1, the same process is to be performed on the language 2.

Although the explanation is omitted here, it is determined that the speech translated into the language 2 can be output, i.e., true is returned, and the determining unit 151 outputs the duration number of the speech duration that can be output in all of the target languages at the step S911 shown in FIG. 9. Moreover, the output unit 152 determines that there is the duration that can be output at the step S705 and outputs the corresponding speech at the step S706 as shown in FIG. 7.

In this example, the first duration in Japanese is output to the terminal 200 that uses Japanese, and the first duration in English is output to the terminal 200 that uses English.

The next duration to be output is the second duration in both Japanese and English, which is expressed as $x_1^{next}=2$ and $x_2^{next}=2$. The determining process is further repeated in this state.

To start the determining process in this state, i is equal to 1, and the first line of the pseudo codes is $j=2$. The second line is $X=\{1\}$, and T is $[t_1,t_{end})$ in the third line. Because the condition in the fourth line is not satisfied, the process moves to the sixth line, where an equation $x_{max}=1$ stands. When X is updated in the seventh line, because there is no integer that satisfies the condition of $2<x\leq 2$, the equation $X=\{\}$ stands.

Therefore, the processes from the eighth line to the twelfth line are not performed. The process moves to the thirteenth line, and true is returned. Next, i is increased by one, and the same process is performed on $i=2$, i.e., the language 2.

Although the explanation is omitted here, it is determined that the speech translated into the language 2 can be output, and the determining unit 151 outputs the duration number of the speech duration that can be output in all of the target languages, i.e., the second duration in both Japanese and English, at the step S911 shown in FIG. 9.

Figure 14:
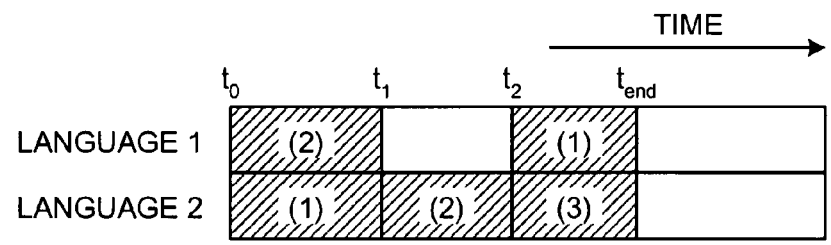

The pseudo codes in the seventh to the twelfth lines are required in case of a situation shown in FIG. 14. The first duration is to be output next in both languages 1 and 2, and the pseudo codes are performed in the case of $i=1$.

The first line is $j=2$, and the second line is $X=\{3\}$. In the third line, T is $[t_2, t_{end})$. Because the condition in the fourth line is not satisfied, the process moves to the sixth line, where an equation $x_{max}=3$ stands.

In the seventh line, X is updated to $\{2,3\}$. In the eighth line, X is equal to 2, and k is equal to 1 in the ninth line. The durations of T are $[t_0,t_1)$ and $[t_2,t_{end})$ in the tenth line. Based on $S_2^2=[t_1,t_2)$, the condition in the eleventh line is satisfied. The twelfth line is performed and false is returned. In other words, it is determined that no speech duration can be output, and the process is terminated.

If the processes in the seventh to the twelfth lines are not performed, the duration number 1 is determined to be output in both languages 1 and 2 in the state as shown in FIG. 14. However, if the waiting time until the duration $[t_1,t_2)$ in the language 1 is output is longer than the waiting time until the first duration in each language is output, a user of the language 1 has to wait while listening to the content of $[t_2,t_{end})$, and the user of the language 2 has to wait while listening to the content of $[t_0,t_1)$.

In this manner, the output of the speech cannot be delayed to present the same contents to the users at the same time as much as possible. The processes in the seventh to the twelfth lines are required to perform an appropriate delay.

The determination process in a different state is explained referring to FIG. 5. It is assumed here that the translated speeches are output in the languages 1 and 2, and that only the first speech duration has been generated in each language. In other words, the output speech of the duration $[t_0,t_2)$ translated into the language 1 has been generated, and the output speech of the duration $[t_0,t_1)$ translated into the language 2 has been generated.

In this example, i is 1 and j is 2 in the pseudo codes. The second line is $X=\{1\}$ because $S_1^2 \cap S_1^1=S_1^2$ is satisfied and the X is not empty. In the third line, T is $S_1^2=[t_0,t_1)$. Therefore, the conditional statement in the fourth line is true, and false is returned because the condition in the fifth line is not satisfied.

In this manner, because the second speech duration in the language 2 has not been generated, the second speech duration in the language 1 is not output.

If there is no duration of which the start point and the end point match among the different languages, none of the speech durations can be output. However, because at least one speech starts and ends at the same points for all the languages, such a case does not occur.

As described above, the speech translation apparatus 100 according to the first embodiment stores therein the translated speech until the source speech is translated into all the languages, and outputs the translated speech when the translated speeches are generated in all the languages. In this manner, the time lags of the speeches output for the participants can be minimized.

According to the first embodiment, all the speeches output from the translating unit 140 are mixed with those in the speech storage unit 110. In this case, the mixed speech is output to the terminal 200 of the participant that spoke the speech, and there can be an echo phenomenon that his/her own speech is output with delay. By hearing his/her own voice during the speech, the speaker feels awkward to speak.

A speech translation apparatus 1500 according to a second embodiment does not send the speech to the terminal that received the source speech, whereby preventing the source speech to be delivered to the speaker thereof.

Figure 15:
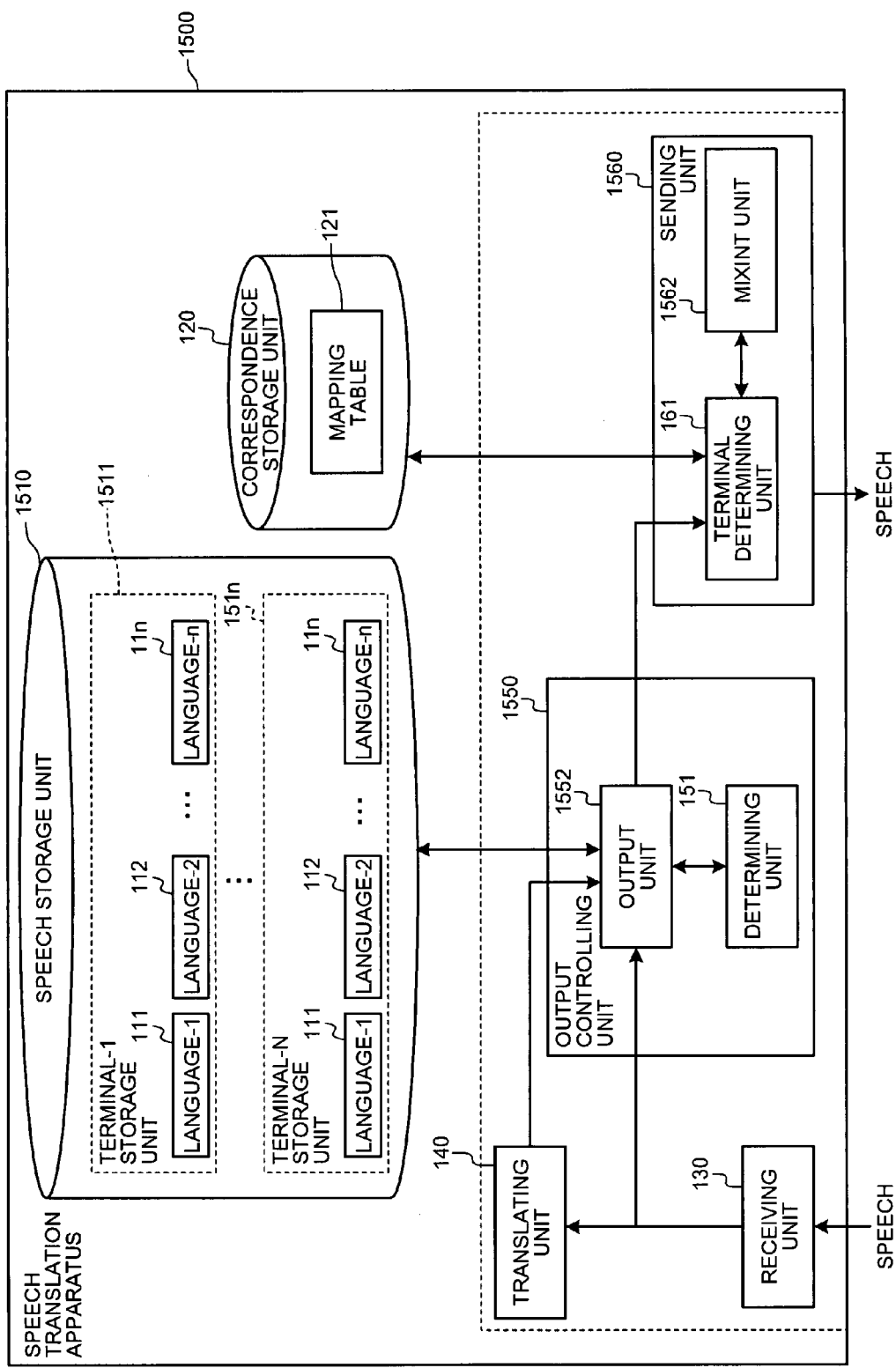
FIG. 15 is a block diagram of a speech translation apparatus according to a second embodiment of the present invention.

As shown in FIG. 15, the speech translation apparatus 1500 includes a speech storage unit 1510, the correspondence storage unit 120, the receiving unit 130, the translating unit 140, an output controlling unit 1550, and a sending unit 1560.

Data configuration in the speech storage unit 1510, function of the output controlling unit 1550, and function of the sending unit 1560 are different from those in the first embodiment. Because configurations and functions of other units are same as those in the speech translation apparatus 100 according to the first embodiment, the same numerals are used as shown in FIG. 3, and the explanation thereof is omitted.

The speech storage unit 1510 includes terminal-N storage units 151n that store therein the speech of the corresponding terminal 200, where N and n are natural numbers. The terminal-N storage unit 151n stores therein the output speech in all languages.

The output controlling unit 1550 includes the determining unit 151 and an output unit 1552. The output unit 1552 functions differently from the output unit 152 according to the first embodiment.

The output unit 1552 extracts the receiving terminal number of the terminal 200 that sent the source speech from the information received from the translating unit 140, and acquires the target languages. The output unit 1552 then stores the output speech in the language-n storage units 11n corresponding to the acquired languages in the terminal-N storage unit 151n corresponding to the receiving terminal number.

Unlike the first embodiment, the output unit 1552 does not mix speeches when it stores the speech in the speech storage unit 1510. The speech in the speech storage unit 1510 is output to the sending unit 1560 when it is determined to be capable of outputting, and it is sent to each terminal 200 after being mixed in the sending unit 1560.

The sending unit 1560 mixes the speeches before sending the speech to the terminal 200, and includes the terminal determining unit 161 and a mixing unit 1562. The terminal determining unit 161 functions as explained in the first embodiment, and the explanation thereof is omitted.

The mixing unit 1562 mixes the speech received from the terminal determining unit 161 after removing the speech received from the terminal 200 to which the speech is sent to (hereinafter, "destination terminal 200"), and outputs the mixed speech. The mixing unit 1562 determines whether the speech to be output was originally sent from the destination terminal 200 by comparing the receiving terminal number from the terminal determining unit 161 with the identifier of the destination terminal 200.

Figure 16:
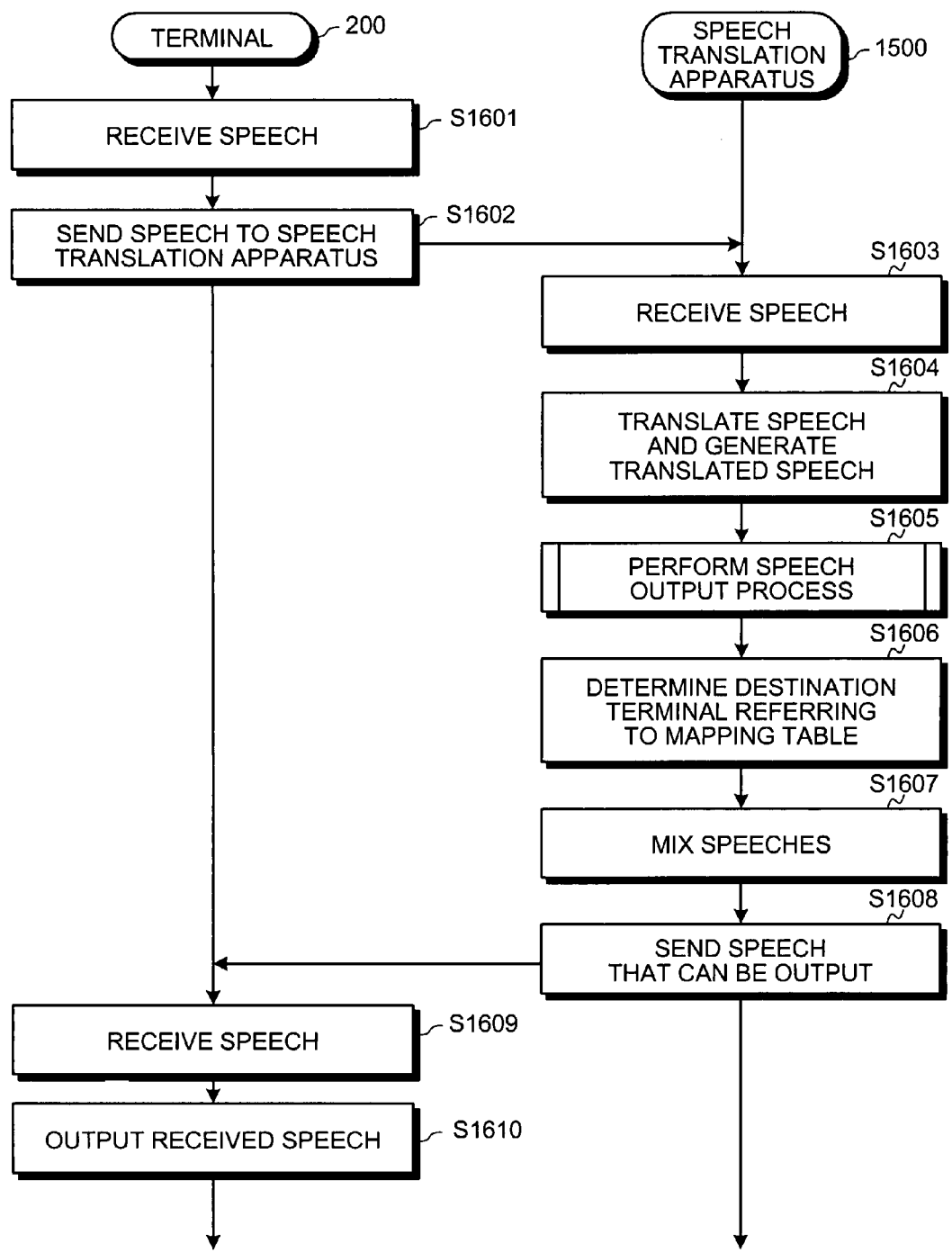
FIG. 16 is a sequence diagram of a speech translating process according to the second embodiment.

A speech translating process performed by the speech translation apparatus 1500 according to the second embodiment is explained referring to FIG. 16.

Steps S1601 to S1604 are same as the steps S601 to S604 shown in FIG. 6, and the explanation thereof is omitted.

At a step S1605, the output controlling unit 1550 performs the speech output process, which will be detailed later.

After the speech output process, the terminal determining unit 161 determines the terminal 200 to which the translated speech in each language is sent by referring to the mapping table 121 (step S1606). This is the same process as the step 606 shown in FIG. 6.

The mixing unit 1562 mixes the speeches to be sent (step S1607). In other words, the mixing unit 1562 acquires the output speech in the target language from the language-n storage unit 11n corresponding to the language used in the destination terminal 200, and if a plurality of speeches are acquired, the mixing unit 1562 mixes the speeches. The mixing unit 1562 removes the speech originally sent from the destination terminal 200 before mixing the speeches, and sends the mixed speech.

Steps S1608 to S1610 are same as the steps S607 to S609 shown in FIG. 6, and the explanation thereof is omitted.

Figure 17:
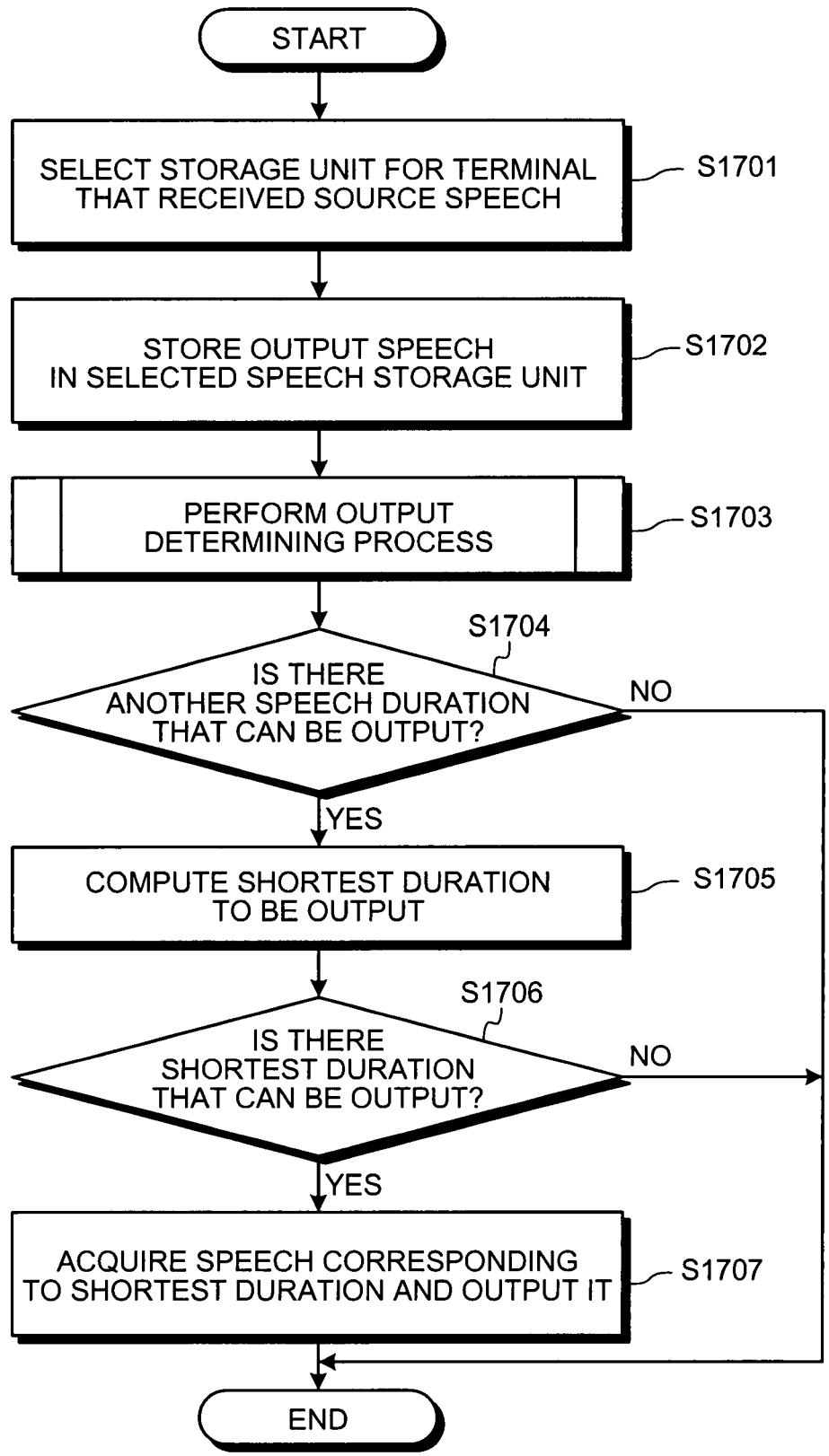
FIG. 17 is a flowchart of a speech output process according to the second embodiment.

The speech output process at the step S1605 is detailed referring to FIG. 17.

The output unit 1552 selects the terminal-N storage unit 151n corresponding to the terminal 200 that received the source speech, and selects the language-n storage unit 11n corresponding to the language of the speech received from the receiving unit 130 or the translating unit 140 (step S1701). The output unit 1552 stores the output speech in the selected terminal-N storage unit 151n (step S1702). The speech is not mixed at this timing according to the second embodiment.

Steps S1703 to S1707 are same as the steps S702 to S706 shown in FIG. 7, and the explanation thereof is omitted.

As described above, the speech translation apparatus 1500 according to the second embodiment does not send the speech to the terminal 200 that received the source speech, whereby preventing the echo phenomenon.

A speech translation apparatus 2000 according to a third embodiment a delay due to a network failure by sending the translated speech to the terminals 200 immediately after the translating process and storing the speech information in the terminals 200.

As shown in FIG. 18, a terminal 1800 includes the speech receiving unit 201, the sending unit 202, the first receiving unit 203, the speech output unit 204, a saving unit 1805, a second receiving unit 1806, an output unit 1807, and a speech storage unit 1810.

The terminal 1800 is different from the terminal 200 according to the first embodiment in that the saving unit 1805, the second receiving unit 1806, the output unit 1807, and the speech storage unit 1810 are added. Because configurations and functions of other units are same as those in the terminal 200 according to the first embodiment, the same numerals are used as shown in FIG. 2, and the explanation thereof is omitted.

The speech storage unit 1810 includes one of the language-n storage units 11n that corresponds to the language used in the speech storage unit 1810. In other words, the storage unit that stores therein the speech is included in the terminal 1800.

The saving unit 1805 stores the speech sent from the speech translation apparatus 2000 to the first receiving unit 203 in the speech storage unit 1810. As shown in FIG. 19, the speech translation apparatus 2000 sends the receiving terminal number, the output-speech duration number, and the output speech associated with one another, and the first receiving unit 203 receives them.

If the first receiving unit 203 receives a speech including a superposed speech duration, the saving unit 1805 generates the mixed speech and stores it in the speech storage unit 1810 because the source speech of the received speech can have been received by a plurality of the terminals 1800 at the same time. The saving unit 1805 also generates the information shown in FIG. 8 used to compute the shortest duration at the time of receiving the speech and stores it in the speech storage unit 1810.

The second receiving unit 1806 receives the output-speech duration number and the receiving terminal number sent from the speech translation apparatus 2000 as the information of the duration to be output.

The output unit 1807 refers to the information received by the second receiving unit 1806, acquires the shortest duration of the speech duration that is ready to be output from the terminals 1800, and outputs it. The output unit 1807 eliminates the speech that has been output from the speech storage unit 1810.

As shown in FIG. 20, the speech translation apparatus 2000 includes the correspondence storage unit 120, a receiving unit 2030, a translating unit 2040, an output controlling unit 2050, and a sending unit 2060.

The speech translation apparatus 2000 is different from the speech translation apparatus 100 according to the first embodiment in that the speech storage unit 110 is not included and that the receiving unit 2030, the translating unit 2040, the output controlling unit 2050, and the sending unit 2060 function differently. Because configurations and functions of other units are same as those in the speech translation apparatus 100 according to the first embodiment, the same numerals are used as shown in FIG. 3, and the explanation thereof is omitted.

The receiving unit 2030 outputs the received speech also to the sending unit 2060 as it is, and outputs information of the speech durations of the received speech to the output controlling unit 2050.

The translating unit 2040 outputs the translated speech also to the sending unit 2060 but not to the output controlling unit 2050. The translating unit 2040 outputs only the information of the speech duration of the output speech to the output controlling unit 2050.

As shown in FIG. 21, the information input to the sending unit 2060 includes the receiving terminal number, the output-speech duration number, the output speech, and the language information.

As shown in FIG. 22, the information input to the output controlling unit 2050 includes the receiving terminal number, the input speech duration, the output-speech duration number, and the language information.

The duration information transferred from the receiving unit 2030 to the output controlling unit 2050 is not delimited by the unit of the speech duration or the word. The duration information is transferred at the minimum unit that can be defined as a duration. For example, if the sampling frequency is eight kilohertz, eight thousand durations are generated per second. However, to output the speech in the same language as it was received, the orders of the received speech and the output speech are the same, and the receiving unit 2030 has only to transfer the last point of the speech received so far to the output controlling unit 2050.

The output controlling unit 2050 controls the timing to output the speech, and includes the determining unit 151 and an output unit 2052. The determining unit 151 functions as explained in the first embodiment, and the explanation thereof is omitted.

The output unit 2052 outputs information including the output-speech duration number of the speech duration for which the determining unit 151 has generated the translated speech in all the languages.

As shown in FIG. 23, the information output from the output unit 2052 includes the receiving terminal number, the output-speech duration number, and the language information.

Figure 24:
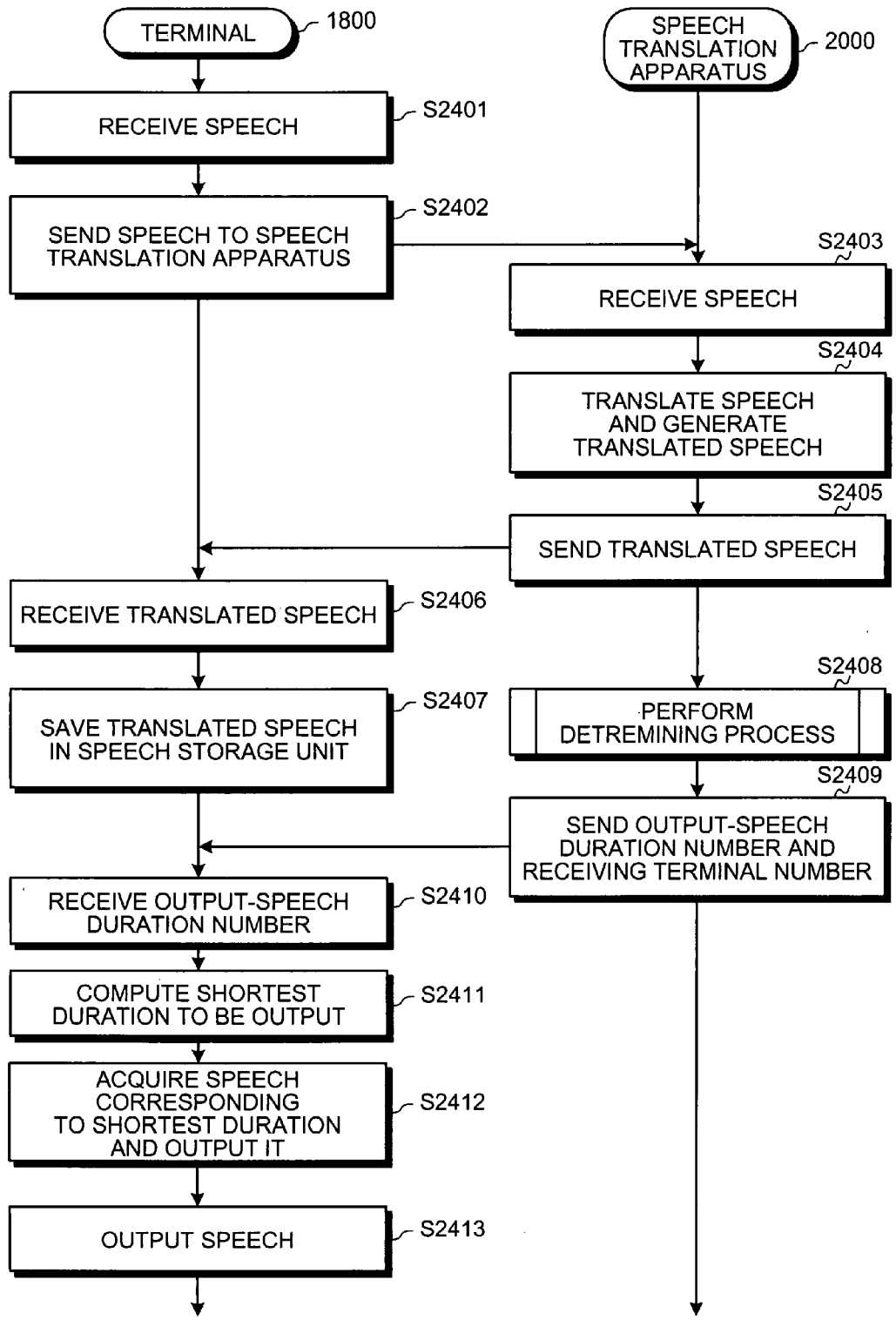
FIG. 24 is a sequence diagram of a speech translating process according to the third embodiment.

A speech translating process performed by the speech translation apparatus 2000 according to the third embodiment is explained referring to FIG. 24.

Steps S2401 to S2404 are same as the steps S601 to S604 shown in FIG. 6, and the explanation thereof is omitted.

After the translating process, the sending unit 2060 sends the information including the translated speech generated by the translating unit 2040 as shown in FIG. 19 to the terminal 1800 (step S2405), and the first receiving unit 203 receives the information (step S2406). The saving unit 1805 saves the translated speech in the speech storage unit 1810 (step S2407).

In the speech translation apparatus 2000, the determining unit 151 performs the determining process (step S2408), which will be detailed later.

After the determining process of the output duration, the sending unit 2060 sends the output-speech duration number of the speech duration determined to be capable of outputting and the receiving terminal number to the terminal 1800 (step S2409).

The second receiving unit 1806 receives the output-speech duration number and the receiving terminal number (step S2410). The output unit 1807 generates such information as shown in FIG. 8 by referring to the output-speech duration number and the receiving terminal number, and computes the shortest duration to be output (step S2411). The process of computing the shortest duration is same as explained in the first embodiment, and the explanation thereof is omitted.

The output unit 1807 acquires the speech corresponding to the shortest duration from the speech storage unit 1810 and outputs it to the speech output unit 204 (step S2412). The speech output unit 204 outputs the speech (step S2413).

Figure 25:
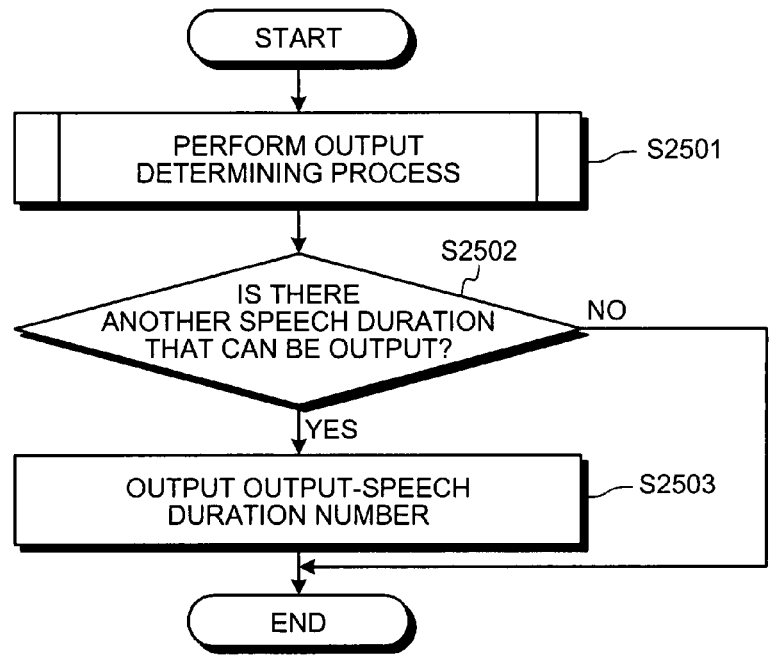
FIG. 25 is a sequence diagram of a determining process performed by a determining unit shown in FIG. 20.

The speech output process at the step S2408 is detailed referring to FIG. 25.

Steps S2501 and S2502 are same as the steps S702 and S703 shown in FIG. 7, and the explanation thereof is omitted.

If there is not a duration that can be output (NO at step S2502), the output unit 2052 terminates the determining process.

If there is the duration that can be output (YES at step S2502), the output unit 2052 outputs information as shown in FIG. 23 (step S2503), and terminates the determining process.

As described above, according to the third embodiment, the information of the speech duration to be output as shown in FIG. 23 is output if the determining unit 151 determines that the speech duration can be output is present.

Because the speech translation apparatus 2000 according to the third embodiment sends a large volume of speech data to the terminals 1800 in series, delay of the output speech due to the network failure is reduced.

In the first embodiment, the second embodiment, and the third embodiment, a client-server system configuration is used. The speech translation corresponding to a server performs the translating process, and the terminal corresponding to a client only outputs the translated speech.

According to a fourth embodiment, there is not such a server that intensively perform processes. Instead, an apparatus provided for each participant mutually exchange information and performs the translating process. In other words, a speech translation apparatus 2600 according to the fourth embodiment controls the timing to output a speech translated in itself based on information received from the speech translation apparatus 2600 of another participant.

Figure 26:
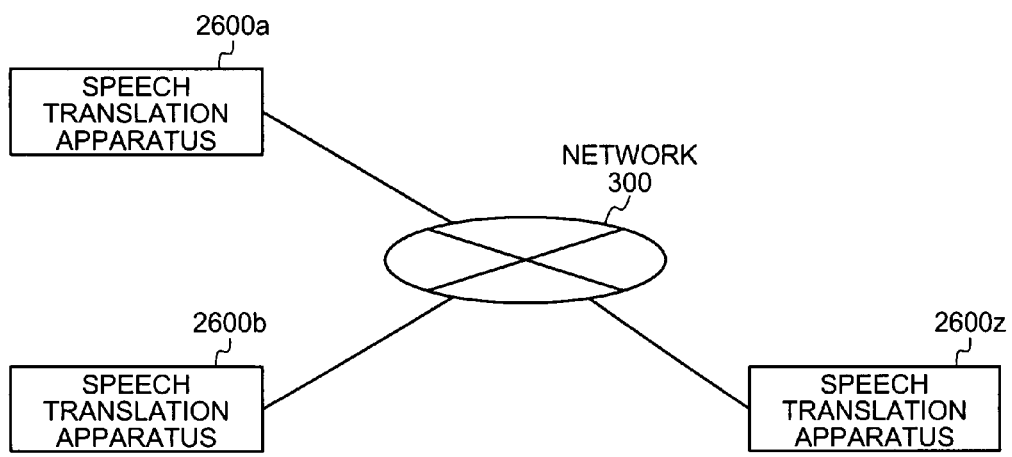
FIG. 26 is a schematic view of a conference system according to a fourth embodiment of the present invention.

As shown in FIG. 26, a conference system according to the fourth embodiment includes a plurality of speech translation apparatuses 2600a, 2600b, and 2600z (each one is also referred to as the speech translation apparatus 2600) connected with one another via the network 300.

Figure 27:
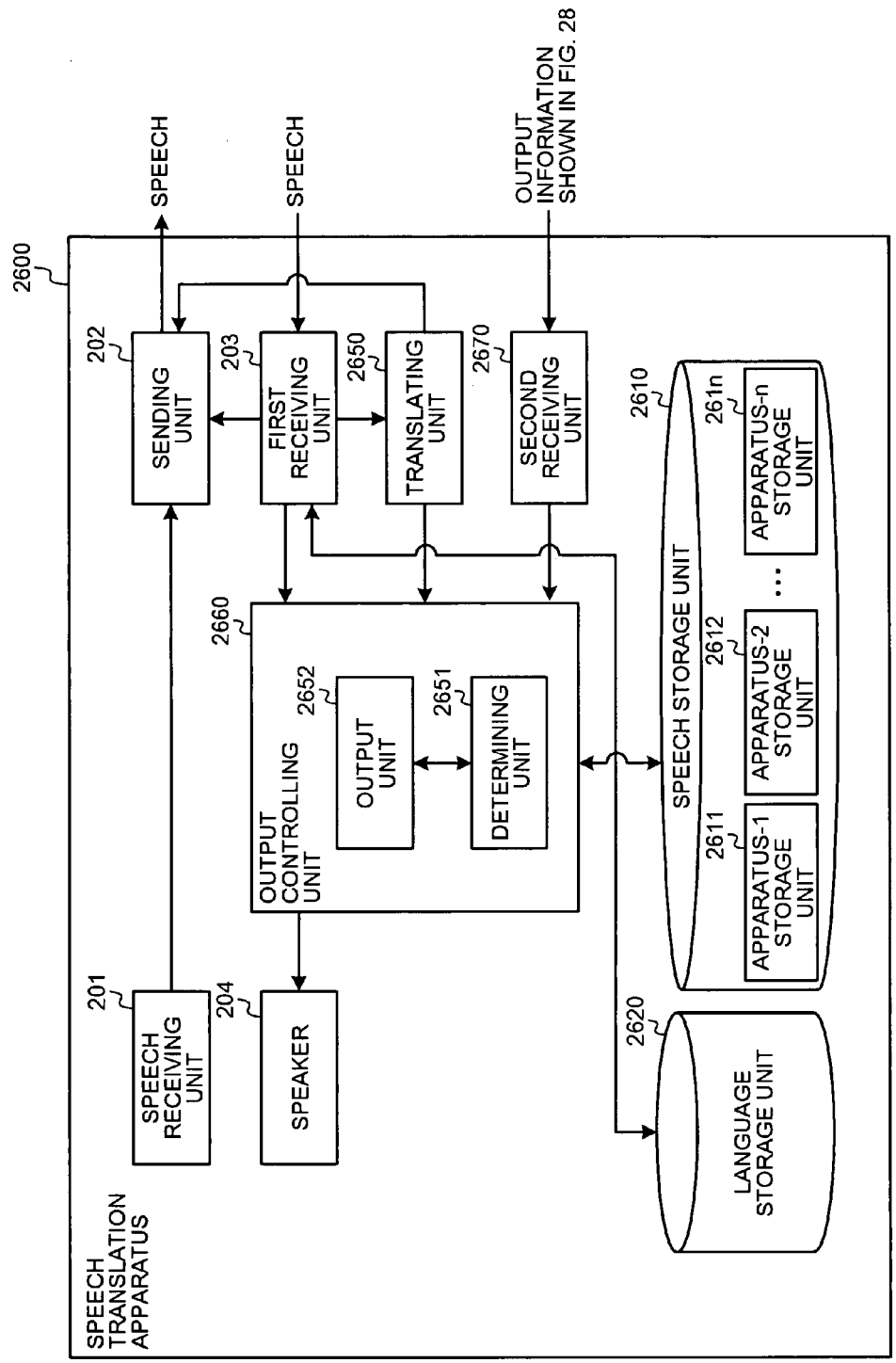
FIG. 27 is a block diagram of a speech translation apparatus according to the fourth embodiment.

As shown in FIG. 27, the speech translation apparatus 2600 includes the speech receiving unit 201, the sending unit 202, the first receiving unit 203, the speech output unit 204, a speech storage unit 2610, a language storage unit 2620, a translating unit 2650, an output controlling unit 2660, and a second receiving unit 2670.

The speech receiving unit 201, the sending unit 202, the first receiving unit 203, and the speech output unit 204 function as explained in the first embodiment, and the explanation thereof is omitted.

The speech storage unit 2610 stores therein speeches received from other speech translation apparatuses 2600 with respect to each apparatus. The speech storage unit 2610 includes storage subunits to store the speeches with respect to each apparatus, such as an apparatus-1 storage unit 2611, an apparatus-2 storage unit 2612, ..., and an apparatus-n storage unit 261n.

The language storage unit 2620 stores therein the languages and identifiers of the speech translation apparatuses 2600 that use the languages in the conference system associated with each other. According to the first embodiment, the terminal 200 sends the language to be used to the speech translation apparatus 100 when the terminal 200 is connected to the speech translation apparatus 100 or when the communication starts. According to the fourth embodiment, the speech translation apparatuses 2600 exchange information of the language to be used with one another when each of the speech translation apparatuses 2600 is connected.

The translating unit 2650 translates the received speech into the language used in the speech translation apparatus 2600, and generates the translated speech. For example, if Japanese is used, the translating unit 2650 needs to translate the received speech into English; however, it does not need to translate a Japanese speech into any other language. The translated speech is output to the output controlling unit 2660.

Unlike the translating unit 140 according to the first embodiment, the translating unit 2650 outputs information that includes the output terminal number to the output controlling unit 2660. The same information is exchanged among the speech translation apparatuses 2600.

The second receiving unit 2670 receives the information output from other speech translation apparatuses 2600.

As shown in FIG. 28, the information output from the translating unit 2650 includes a receiving apparatus number, the input speech duration, the output-speech duration number, and an output apparatus number. The information is different from the information output from the translating unit 140 according to the first embodiment in that the output speech and the language information are not included and the output apparatus number indicative of an identifier of the speech translation apparatus 2600 that sent the speech is added.

The output controlling unit 2660 controls the timing to output the speech, and includes a determining unit 2651 and an output unit 2652.

The determining unit 2651 determines whether the translated speech can be output by determining whether the speech duration has been translated by all the speech translation apparatuses 2600.

The output unit 2652 outputs the translated speech and the source speech in the speech duration that has been translated by all the speech translation apparatuses 2600.

As described above, though the translated speech is generated with respect to each language according to the first embodiment, the determination process and the speech output process are performed with respect to each speech translation apparatus 2600 according to the fourth embodiment.

This is because the translation process in the same direction can be performed in different speech translation apparatuses 2600 unlike the first embodiment. For example, if speech translation apparatuses A and B use Japanese and a speech translation apparatus C uses English, a speech received from the speech translation apparatus C is translated into Japanese separately in the speech translation apparatuses A and B.

The speech translation apparatuses A and B rarely start and complete the translating process perfectly at the same time, and the timings can largely differ. Therefore, to minimize the difference, the determining process and the speech output process are performed with respect to each speech translation apparatus 2600. The speech translation apparatuses 2600 need to be synchronized in terms of time to measure the speech duration.

Figure 29:
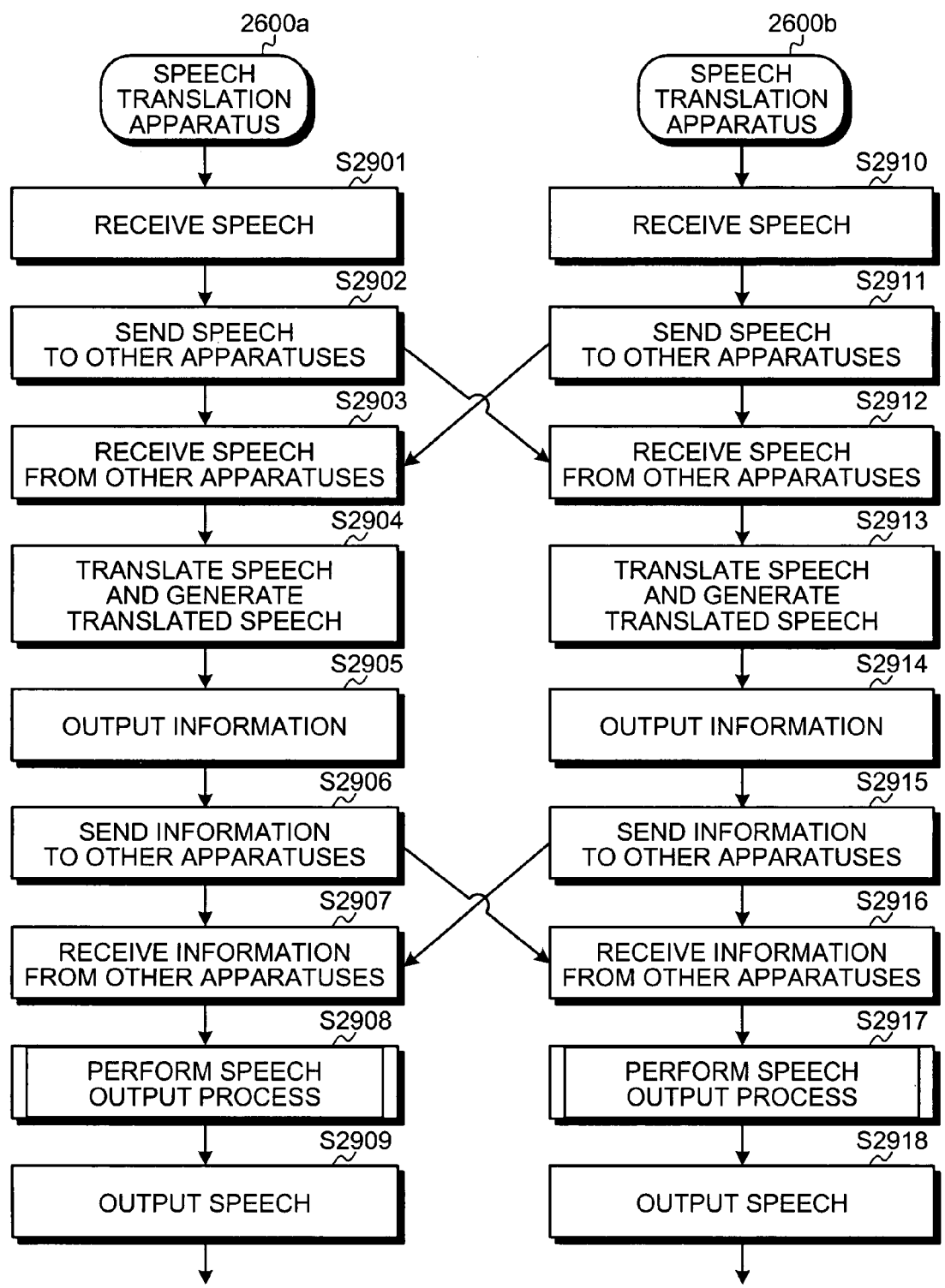
FIG. 29 is a sequence diagram of a speech translating process according to the fourth embodiment.

A speech translating process performed by the speech translation apparatus 2600 according to the fourth embodiment is explained referring to FIG. 29.

The speech receiving unit 201 in the speech translation apparatus 2600a receives a speech (step S2901). The sending unit 202 sends the received speech to the other speech translation apparatus 2600b (step S2902).

The first receiving unit 203 receives the speech sent from the speech translation apparatus 2600b (step S2903). The first receiving unit 203 refers to the language storage unit 2620 for the language used by each apparatus. If the speech translation apparatus 2600b uses the same language as the speech translation apparatus 2600a, the first receiving unit 203 transfers the speech to the output controlling unit 2660, and sends the information shown in FIG. 28 to the speech translation apparatus 2600b. If the speech translation apparatus 2600b uses a different language, the first receiving unit 203 transfers the speech to the translating unit 2650.

The translating unit 2650 translates the received speech into the language used in the speech translation apparatus 2600a and generate the translated speech (step S2904), and outputs the information as shown in FIG. 28 to the output controlling unit 2660 (step S2905). The sending unit 202 sends the information to the speech translation apparatus 2600b (step S2906).

If the speech translation apparatus 2600b sends information, the second receiving unit 2670 in the speech translation apparatus 2600a receives it (step S2907). The output controlling unit 2660 performs the speech output process using the received information in the same method as explained in the first embodiment (step S2908). In the speech output process, the determining process is performed with respect to each speech translation apparatus 2600 instead of language.

The output controlling unit 2660 mixes the speeches received from other speech translation apparatuses 2600 and stores the mixed speech in the speech storage unit 2610.

When the speech duration to be output is determined in the speech output process, the speech in the corresponding speech duration is extracted from the speech storage unit 2610, and the speech output unit 204 outputs the speech (step S2909).

Steps S2910 to S2918 are same as the steps S2901 to S2909 except that they are performed by the speech translation apparatus 2600b, and the explanation thereof is omitted.

As described above, the speech translation apparatus 2600 according to the fourth embodiment exchanges information for the speech translation with another speech translation apparatus 2600, and outputs the speech when a speech by a certain participant is translated by all of the speech translation apparatuses 2600. This minimizes the time lag to output the translated speech to each participant.

A speech translation apparatus 3000 according to a fifth embodiment minimizes a pause of the speech by outputting the translated speech after a predetermined delay.

Figure 30:
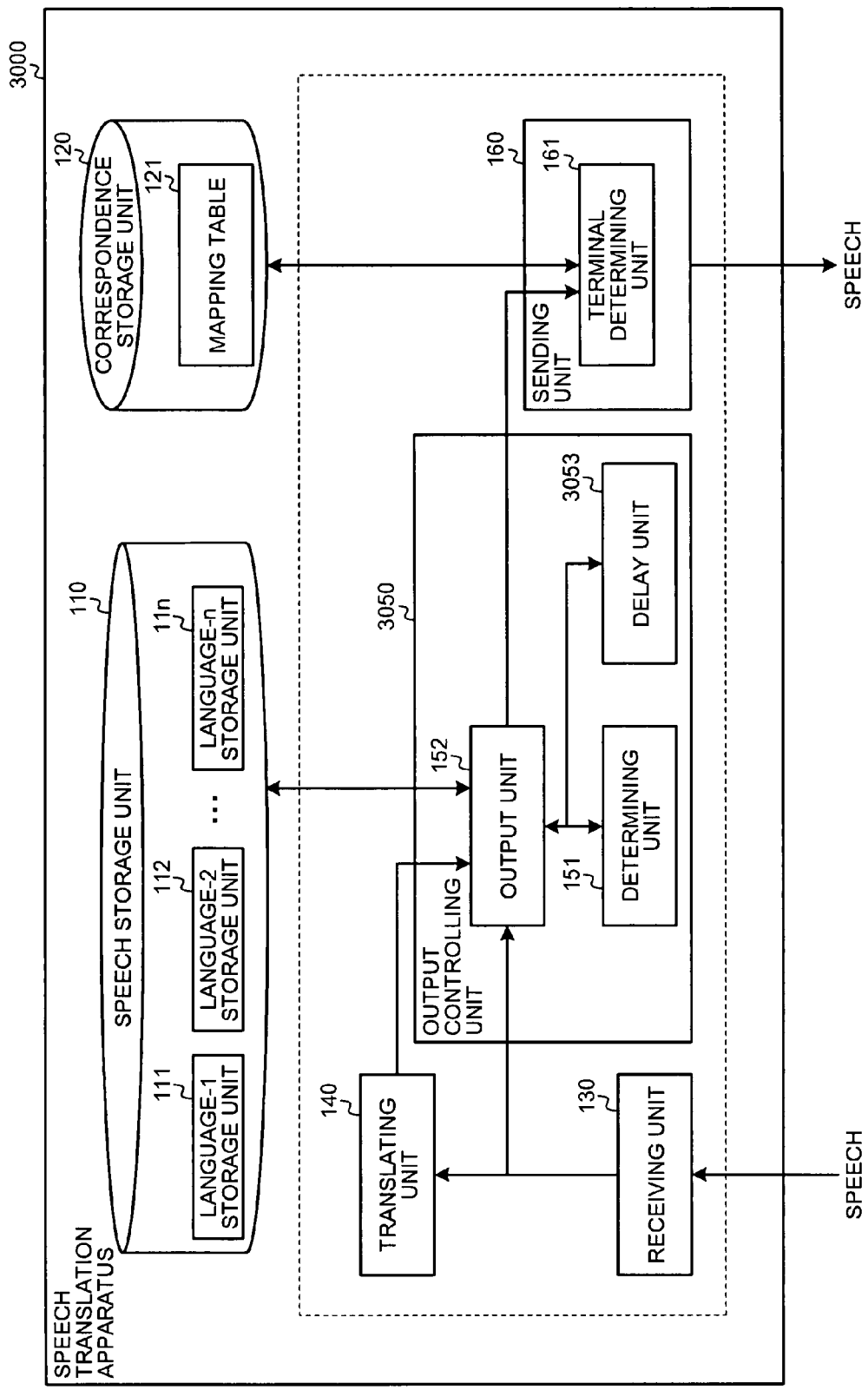
FIG. 30 is a block diagram of a speech translation apparatus according to a fifth embodiment of the present invention.

As shown in FIG. 30, the speech translation apparatus 3000 includes the speech storage unit 110, the correspondence storage unit 120, the receiving unit 130, the translating unit 140, an output controlling unit 3050, and the sending unit 160.

Function of the output controlling unit 3050 is different from that in the first embodiment. Because configurations and functions of other units are same as those in the speech translation apparatus 100 according to the first embodiment, the same numerals are used as shown in FIG. 3, and the explanation thereof is omitted.

The output controlling unit 3050 controls the timing to output the speech, and includes the determining unit 151, the output unit 152, and a delay unit 3053. The determining unit 151 and the output unit 152 function as explained in the first embodiment, and the explanation thereof is omitted.

The delay unit 3053 delays the output of the speech by a predetermined time. The delaying process will be detailed later.

Figure 31:
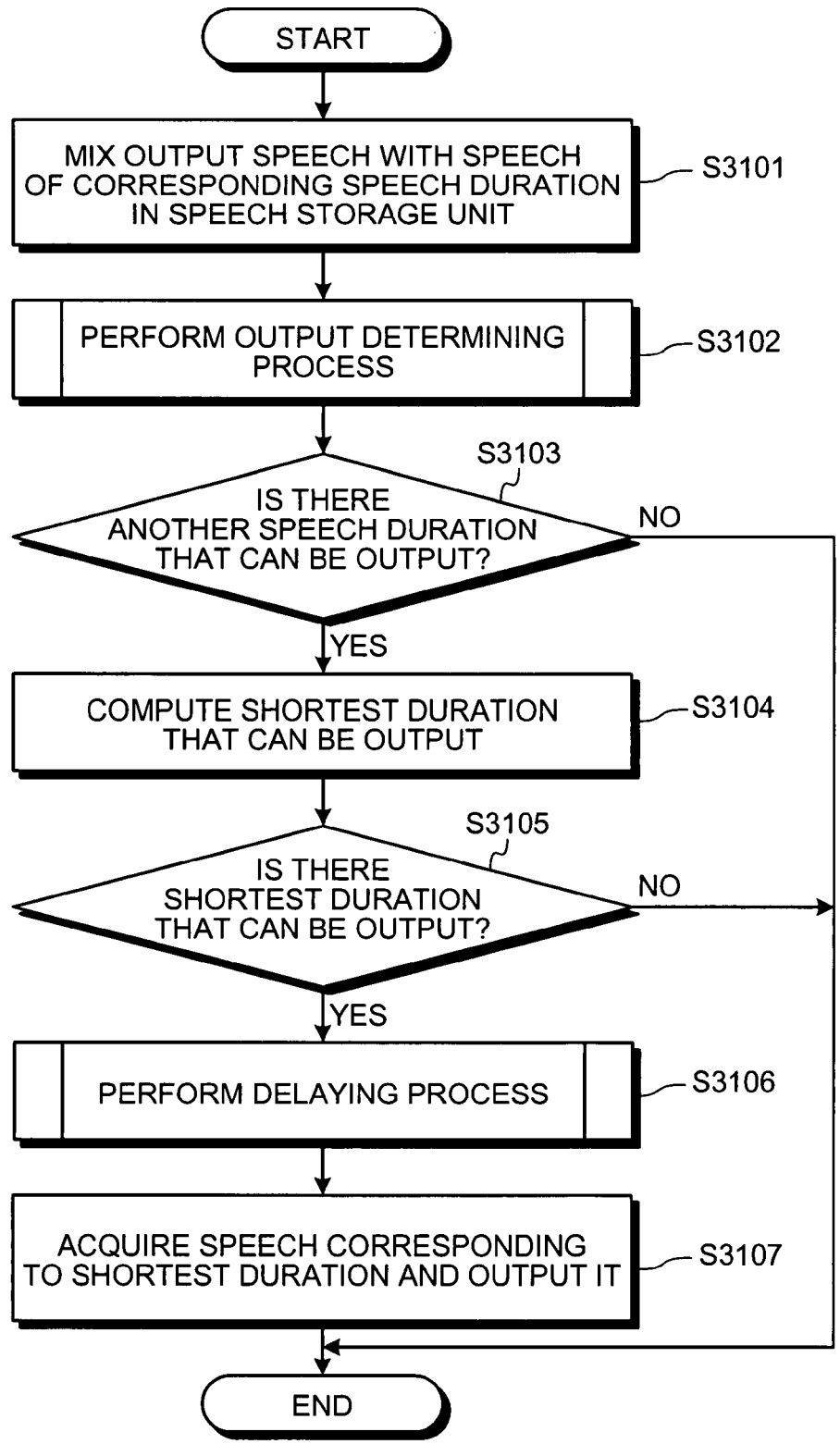
FIG. 31 is a flowchart of a speech output process according to the fifth embodiment.

A speech translating process performed by the speech translation apparatus 3000 according to the fifth embodiment is explained referring to FIG. 31. The flow of the speech translating process is same as explained in the first embodiment except details of the speech output process at the step S605.

Steps S3101 to S3105 are same as the steps S701 to S705 shown in FIG. 7, and the explanation thereof is omitted.

If the shortest duration to be output is present (YES at step S3105), the delay unit 3053 performs the delaying process to delay the output of the speech (step S3106).

After the delaying process, the output unit 152 acquires the speech corresponding to the shortest duration from the speech storage unit 110, and outputs it (step S3107).

Figure 32:
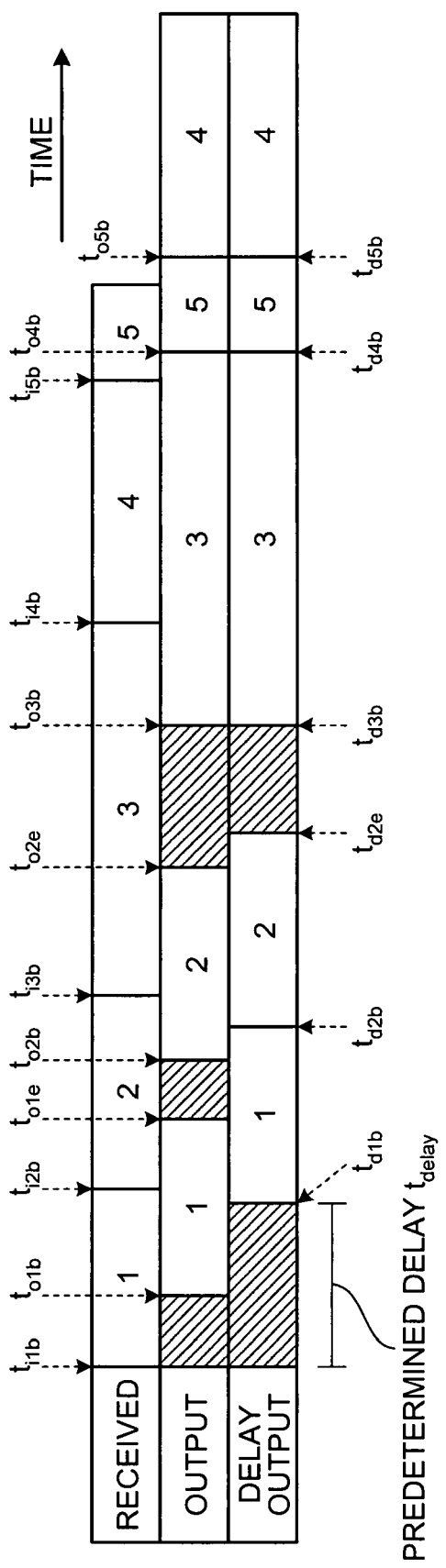
FIG. 32 is an explanatory diagram showing an example of the speech duration.

The concept of the delaying process at the step S3106 is explained referring to FIG. 32.

It is assumed here that the receiving unit 130 receives a speech at times $t_{i1b}$, $t_{i2b}$, $t_{i3b}$, and so on. The time can be based on any one of Greenwich Mean Time, the time passed since the system started, the time passed since the user started to use the system, and the like.

Each of the input speech durations is shown in a row of "received" in the shape of rectangle, and the rectangles are arranged in the order of time assigned to the duration. Numbers in the rectangles are assigned in the order of being received.

The actual speech received by the speech translation apparatus 3000 is continuous, and the speech is not delimited when the speech translation apparatus 3000 receives the speech. As described in the first embodiment, each duration delimited by the translating unit 140 is associated with one of the rectangles in FIG. 32. The duration can be any one of a speech duration and a non-speech duration.

A row of "output" indicates the time at which the determining unit 151 determined to output the speech. The numbers in the rectangles correspond to those of the input speech durations. For example, the output speech 1 is generated from the received speech 1. The generated speech is generally the speech translated from the source speech; however, if the received speech and the output speech use the same language, the source speech can be the output speech as it is.

A row of "delay output" indicates the time at which the delay unit 3053 determined to output the speech. The determining unit 151 outputs the speech at the timing shown in the row of "delay output". The predetermined delay $t_{delay}$ indicates the minimum delay. In other words, the speech cannot be output with a delay shorter than $t_{delay}$.

Figure 33:
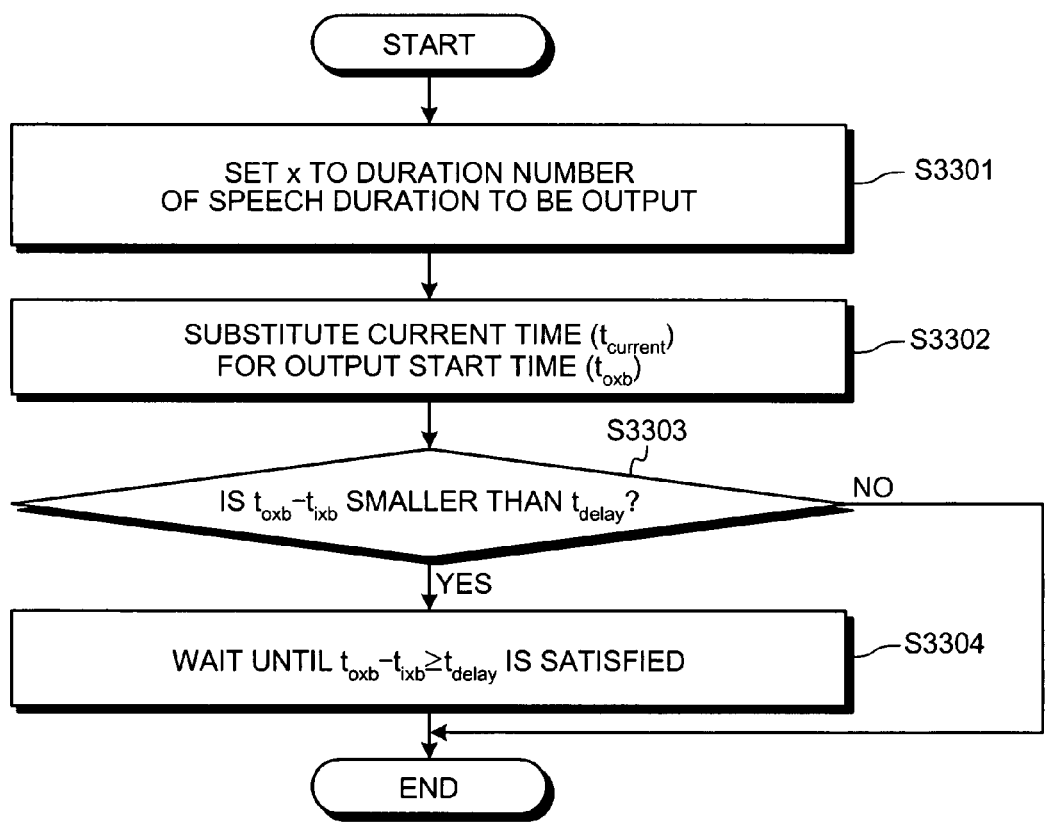
FIG. 33 is a flowchart of a delay eliminating process.

The delaying process is explained referring to FIG. 33.

The delay unit 3053 determines the duration number of the speech duration to be output as x (step S3301), and the current time $t_{current}$ is substituted for an output start time $t_{oxb}$ (step S3302).

The delay unit 3053 determines whether the difference between the output start time $t_{oxb}$ and a time at which the speech in the corresponding duration is received $t_{ixb}$ is smaller than the predetermined delay $t_{delay}$ (step S3303).

If the difference is smaller than the predetermined delay (YES at step S3303), the delay unit 3053 waits until an equation $t_{oxb} - t_{ixb} \geq t_{delay}$ is satisfied (step S3304).

If the difference is not smaller than the predetermined delay (NO at step S3303), it means that the actual delay has exceeded the predetermined delay, and the delay unit 3053 terminates the delaying process.

An example of the delaying process is explained referring to FIG. 32. The delay unit 3053 starts the delaying process upon receiving the duration number from the output unit 152. The explanation is given here assuming that the delay unit 3053 receives a duration number 1 in the row of "received".

One is substituted for x at the step S3301, and the current time $t_{current}$ is substituted for the output start time $t_{o1b}$ at the step S3302.

In FIG. 32, $t_{o1b} - t_{i1b}$ is smaller than $t_{delay}$ (YES at step S3303), and the delay unit 3053 waits until $t_{oxb} - t_{ixb} \geq t_{delay}$ is satisfied (step S3304).

When the delay unit 3053 receives a duration number 2, $t_{o2b} - t_{i2b}$ is smaller than $t_{delay}$ (YES at step S3303), and the delay unit 3053 delays the output (step S3304). In this case, because $t_{d2b} - t_{i2b}$ is equal to $t_{delay}$, the silence is not inserted, and the speech duration 2 is output immediately after the speech duration 1.

When the delay unit 3053 receives a duration number 3, $t_{o3b} - t_{i3b}$ is larger than $t_{delay}$ (NO at step S3303), i.e., the delay due to the translating process is longer than $t_{delay}$, there is no need to insert any delay.

As a result of the translating process, the output speech is not always output in the same order as the source speech was received. Durations 4 and 5 indicate such a case. In this example, the output speech based on the input speech duration 5 is output before the output speech based on the input speech duration 4.

In the first place, a purpose of delaying only $t_{delay}$ is to prevent the output speech from pausing. Therefore, unless the start point of the duration number 5 in the row of "output" $t_{o4b}$ exceeds the sum of the start end of the duration number 4 in the row of "received" $t_{i4b}$ and $t_{delay}$, there is no need to insert the delay. After the speech in the duration number 5 is output, the speech in the duration number 4 is output. With both values combined, there is a delay by at least $t_{delay}$.

As shown in FIG. 32, the start time of the speech duration 5 in the row of "output" is $t_{o4b}$, and $t_{oxb}$ is arranged in ascending order of the value x. In this manner, the delay unit 3053 determines whether to insert a delay without determining whether the order is changed.

Although the fifth embodiment is explained by inserting delays to the example in the first embodiment, it can be applied to other embodiments.

As described above, the speech translation apparatus 3000 according to the fifth embodiment minimizes the pause of the speech by outputting the translated speech after the predetermined delay.

According to the fifth embodiment, if the delay unit 3053 determines that the speech can be output and a previous speech is being output, the speech is not output until the output of the previous speech is completed. Therefore, once the translating process delays more than the predetermined delay $t_{delay}$, the delay due to the translation is the actual delay. In other words, if the translating process delays more than $t_{delay}$, the delay cannot be reduced to $t_{delay}$.

A speech translation apparatus 3400 according to a sixth embodiment minimizes the delay by reducing a reproduction time of the translated speech to be output if the translating process delays more than the predetermined delay.

Figure 34:
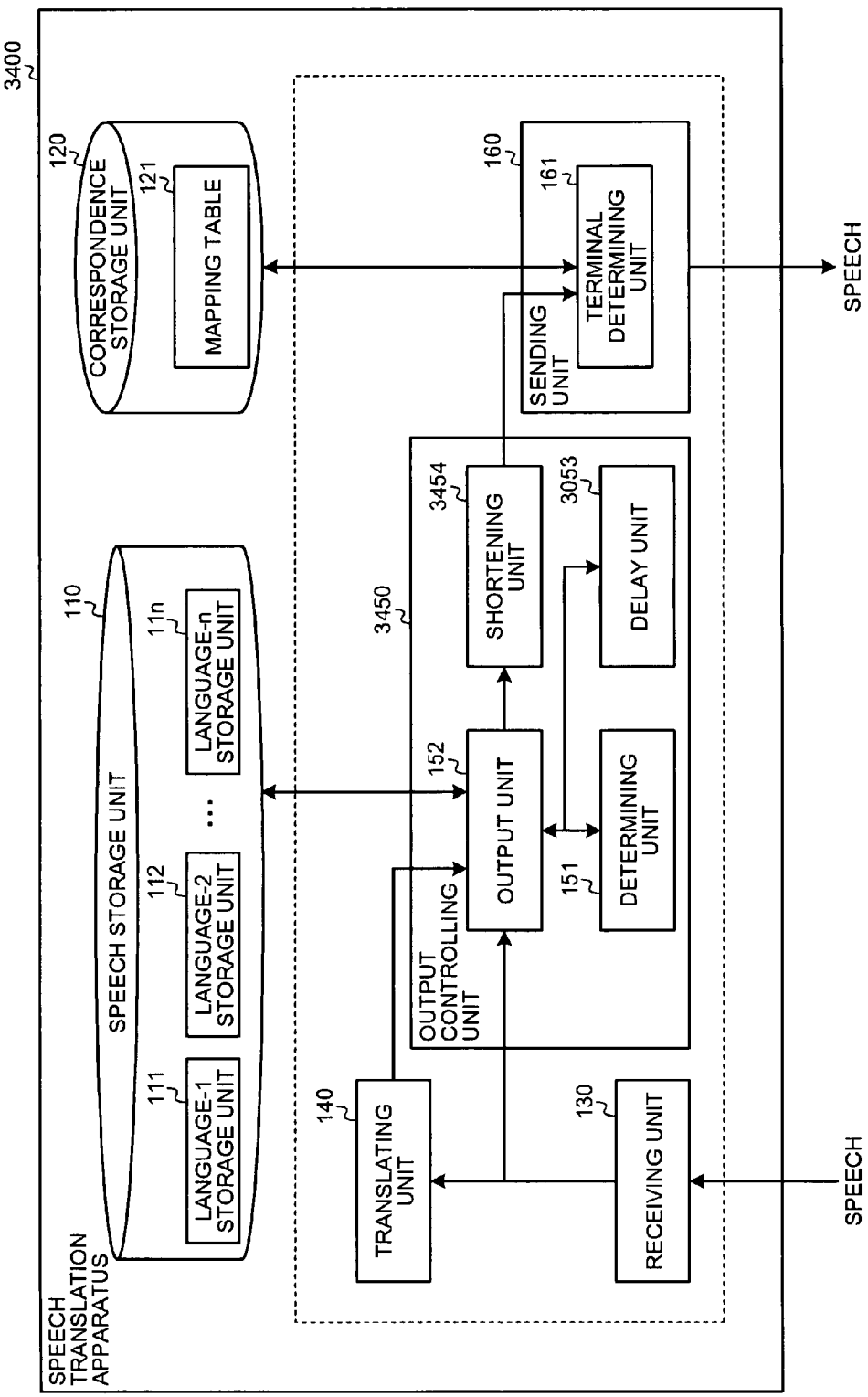
FIG. 34 is a block diagram of a speech translation apparatus according to a sixth embodiment of the present invention.

As shown in FIG. 34, the speech translation apparatus 3400 includes the speech storage unit 110, the correspondence storage unit 120, the receiving unit 130, the translating unit 140, an output controlling unit 3450, and the sending unit 160.

Function of the output controlling unit 3450 is different from that in the fifth embodiment. Because configurations and functions of other units are same as those in the speech translation apparatus 3000 according to the fifth embodiment, the same numerals are used as shown in FIG. 30, and the explanation thereof is omitted.

The output controlling unit 3450 controls the timing to output the speech, and includes the determining unit 151, the output unit 152, the delay unit 3053, and a shortening unit 3454. The determining unit 151, the output unit 152, and the delay unit 3053 function as explained in the fifth embodiment, and the explanation thereof is omitted.

The shortening unit 3454 shortens the reproduction time, i.e., length of the output speech, and transfers it to the sending unit 160. More specifically, the shortening unit 3454 shortens the reproduction time by increasing the reproduction speed of the output speech. The shortening unit 3454 can be configured to detect durations of silence and noise using a silence detection algorithm and a noise detection algorithm and to eliminate the detected duration, whereby shortening the reproduction time.

Moreover, the shortening unit 3454 can be configured to receive information from the translating unit 140 to distinguish speech durations from non-speech durations and to eliminate the non-speech durations based on the information, whereby shortening the reproduction time.

Figure 35:
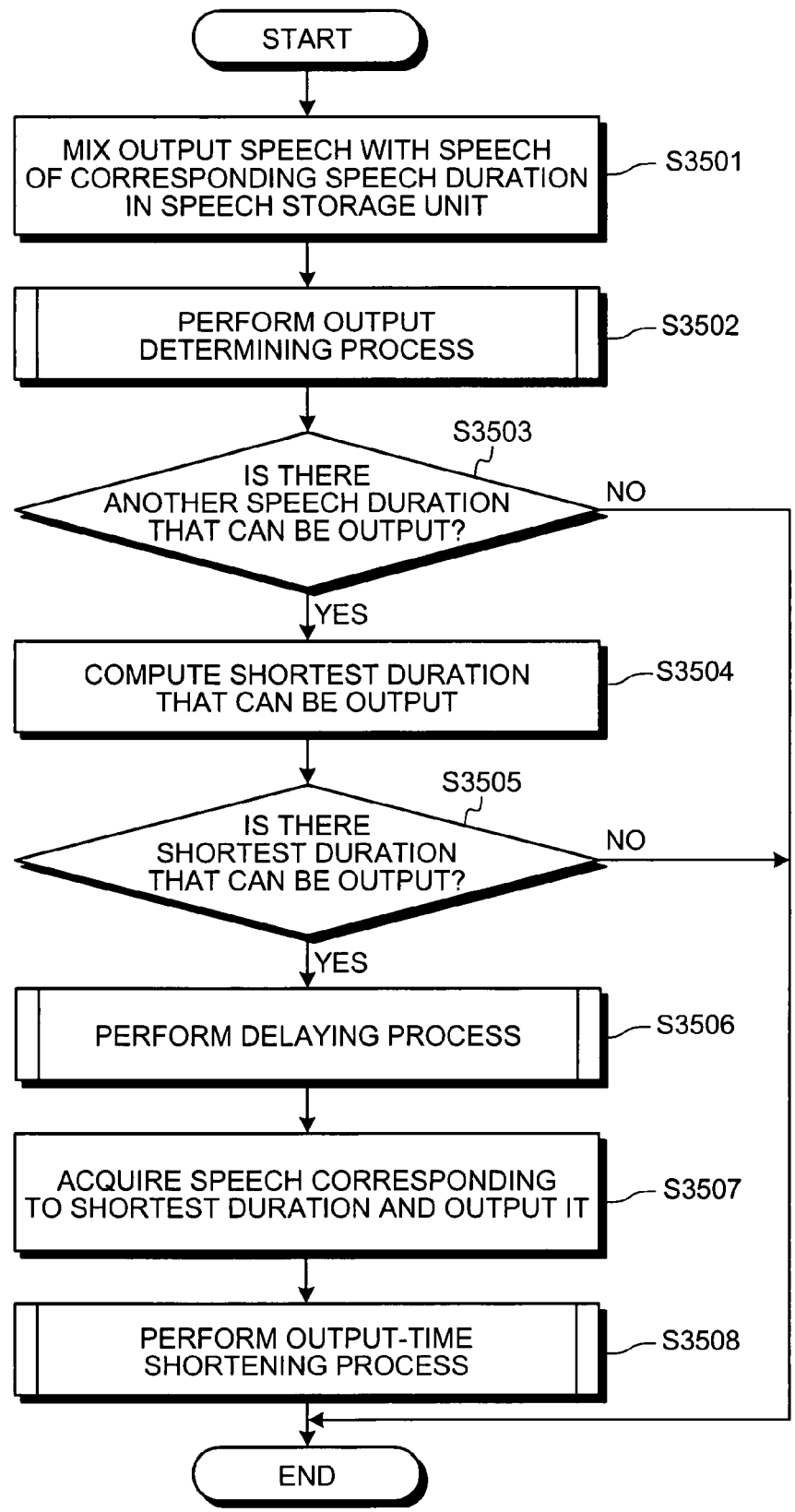
FIGS. 35 and 36 are flowcharts of a speech output process according to the sixth embodiment.

A speech translating process performed by the speech translation apparatus 3400 according to the sixth embodiment is explained referring to FIG. 35. The flow of the speech translating process is same as explained in the fifth embodiment, i.e., FIG. 6 in the first embodiment, except details of the speech output process at the step S605.

Steps S3501 to S3507 are same as the steps S3101 to S3107 shown in FIG. 31, and the explanation thereof is omitted.

After the output unit 152 outputs the speech corresponding to the shortest duration at the step S3107, the shortening unit 3454 performs an output-time shortening process of shortening the reproduction time of the output speech and outputting it (step S3508), and terminates the speech output process.

Figure 36:
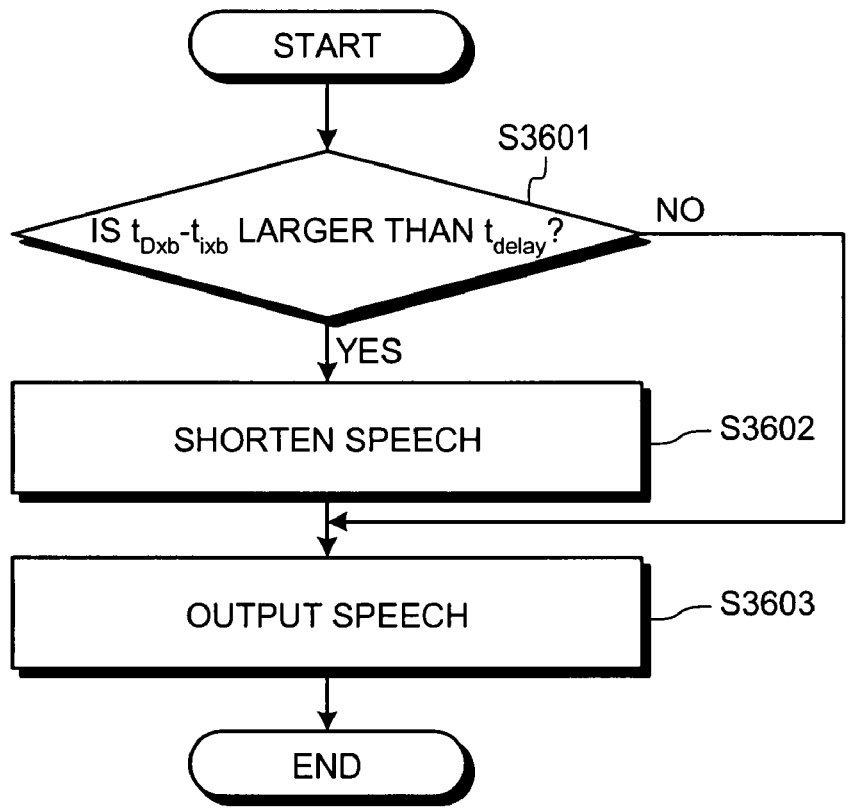

The output-time shortening process at the step S3508 is detailed referring to FIG. 36.

The shortening unit 3454 determines whether the delay due to the translating process is longer than the predetermined delay time $t_{delay}$, i.e., whether the equation $t_{dxb} - t_{ixb} > t_{delay}$ is satisfied (step S3601).

If $t_{dxb} - t_{ixb} > t_{delay}$ is satisfied (YES at step S3601), the shortening unit 3454 shortens the speech (step S3602), and outputs the shortened speech (step S3603).

If $t_{dxb} - t_{ixb} > t_{delay}$ is not satisfied (NO at step S3601), the shortening unit 3454 outputs the speech without shortening it (step S3603).

Figure 37:
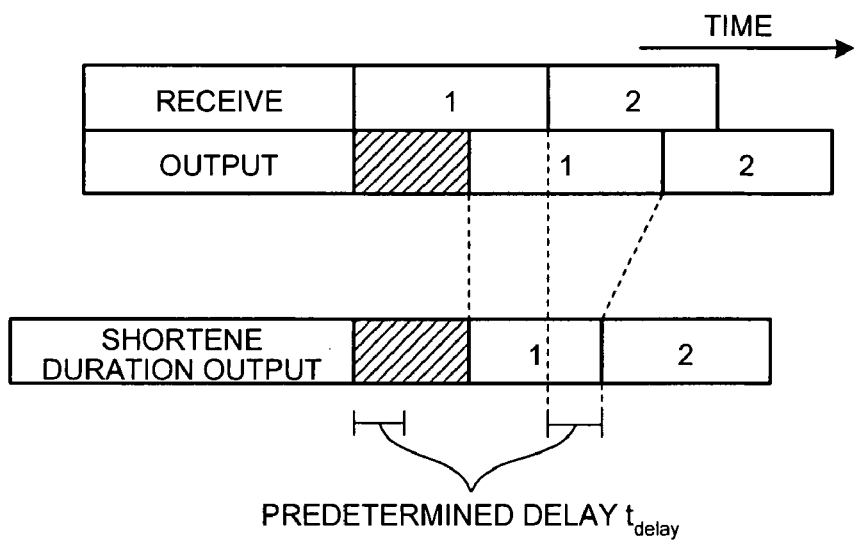
FIG. 37 is an explanatory diagram showing an example of a speech duration shortened by a shortening unit shown in FIG. 34.

An example of the shortening process is explained referring to FIG. 37.

The row of "received" indicates the input speech durations delimited at times when the receiving unit 130 receives the speech and numbers assigned to the input speech durations in the order of being received.

The row of "output" indicates the output speech durations associated with the times at which the speech is output. The row of "shortened duration output" indicates the durations associated with the times at which the shortening unit 3454 outputs the speech.

A duration 1 in the row of "shortened duration output" is shorter than the corresponding duration in the row or "output" because the shortening unit 3454 shortens the input speech before it is output.

The sixth embodiment can be realized in various modifications as shown below.

According to the sixth embodiment, the predetermined delay $t_{delay}$ is determined in advance, and the speech is delayed by at least $t_{delay}$ to be output. The sixth embodiment can be modified to perform the delaying process using a delay dynamically changed based on delays in the past translation process instead of using the fixed delay.

A predetermined number (hereinafter, "n") of most recent delays is acquired from among delays in the translating process before the delay unit 3053 performs the delaying process. The delay output most recently is referred to as a first delay, and an i-th delay is referred to as $L_i$. The older the delay is, the more i is. In the example shown in FIG. 32, after the speech duration 3 is output, the most recent delay $L_1$ is $t_{o3b} - t_{i3b}$, and $L_2$ is $t_{o2b} - t_{i2b}$. The delay is calculated using the following equation:

$$t_{delay} = \alpha \left( \sum_{i=1}^{n} L_i \right) / n \qquad (1)$$

If there is no duration and $L_i$ cannot be calculated, $L_i$ is zero.

In other words, $t_{delay}$ is equal to α times of an average of the latest n delays. A production of a predetermined coefficient α is used because $t_{delay}$ can be underestimated if a simple average of the delays is used. By increasing α, the speech pauses less frequently.

By dynamically changing the delay used for the determining process, the actual delay due to the translating process is less likely to be shorter than $t_{delay}$. In other words, compared with determining $t_{delay}$ in advance, the delay to output the speech is reduced.

If the delay is calculated using the equation (1) from a short speech such as "yes" or "no" replied to a question, $t_{delay}$ is so small that the speech can often pause and the reproduction speed can often increase. An approach to prevent the pause and the increase of the reproduction speed is to exclude short speeches from the calculation of $t_{delay}$. In other words, if the source speech is equal to or shorter than a predetermined length, it is not used for calculating $t_{delay}$.

Similarly, if the delay is calculated from a speech duration that includes silence or noise, the resulting $t_{delay}$ can be too large or too small. To prevent it, the translating unit 140 outputs information indicative of whether the duration is a non-speech duration so that the non-speech duration is not used to calculate $t_{delay}$.

As described above, the speech translation apparatus 3400 according to the sixth embodiment shortens the speech time of the translated speech if the translating process delays more than the predetermined delay, whereby the large delay does not remain.

A speech translation apparatus 3900 according to a seventh embodiment receives the speech and a moving image from a terminal 3800 that receives the speech and the moving image, and outputs the moving image to the terminal 3800 in synchronization with the translated speech.

Figure 38:
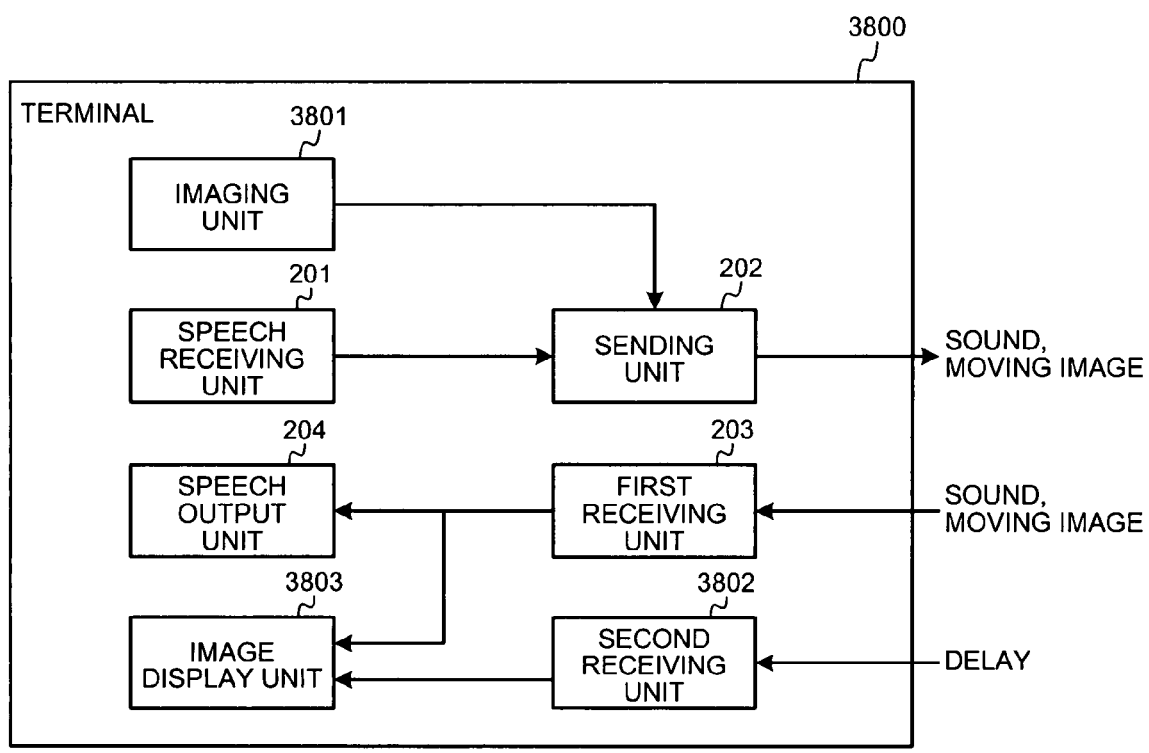
FIG. 38 is a block diagram of a terminal according to a seventh embodiment of the present invention.

As shown in FIG. 38, the terminal 3800 includes the speech receiving unit 201, the sending unit 202, the first receiving unit 203, the speech output unit 204, an imaging unit 3801, a second receiving unit 3802, and an image display unit 3803.

The imaging unit 3801, the second receiving unit 3802, and the image display unit 3803 are added to the terminal 200 according to the first embodiment. Because configurations and functions of other units are same as those in the terminal 200 according to the first embodiment, the same numerals are used as shown in FIG. 2, and the explanation thereof is omitted.

The imaging unit 3801 images the participant and outputs a moving image of the participant. It can be any imaging device such as a commonly used camera. The second receiving unit 3802 receives the delay in the translating process sent from the speech translation apparatus 3900. The image display unit 3803 displays moving images and texts to the participants. It can be any existing display device.

As described above, the terminal 3800 includes a user interface to input and output the moving images as well as speeches.

Figure 39:
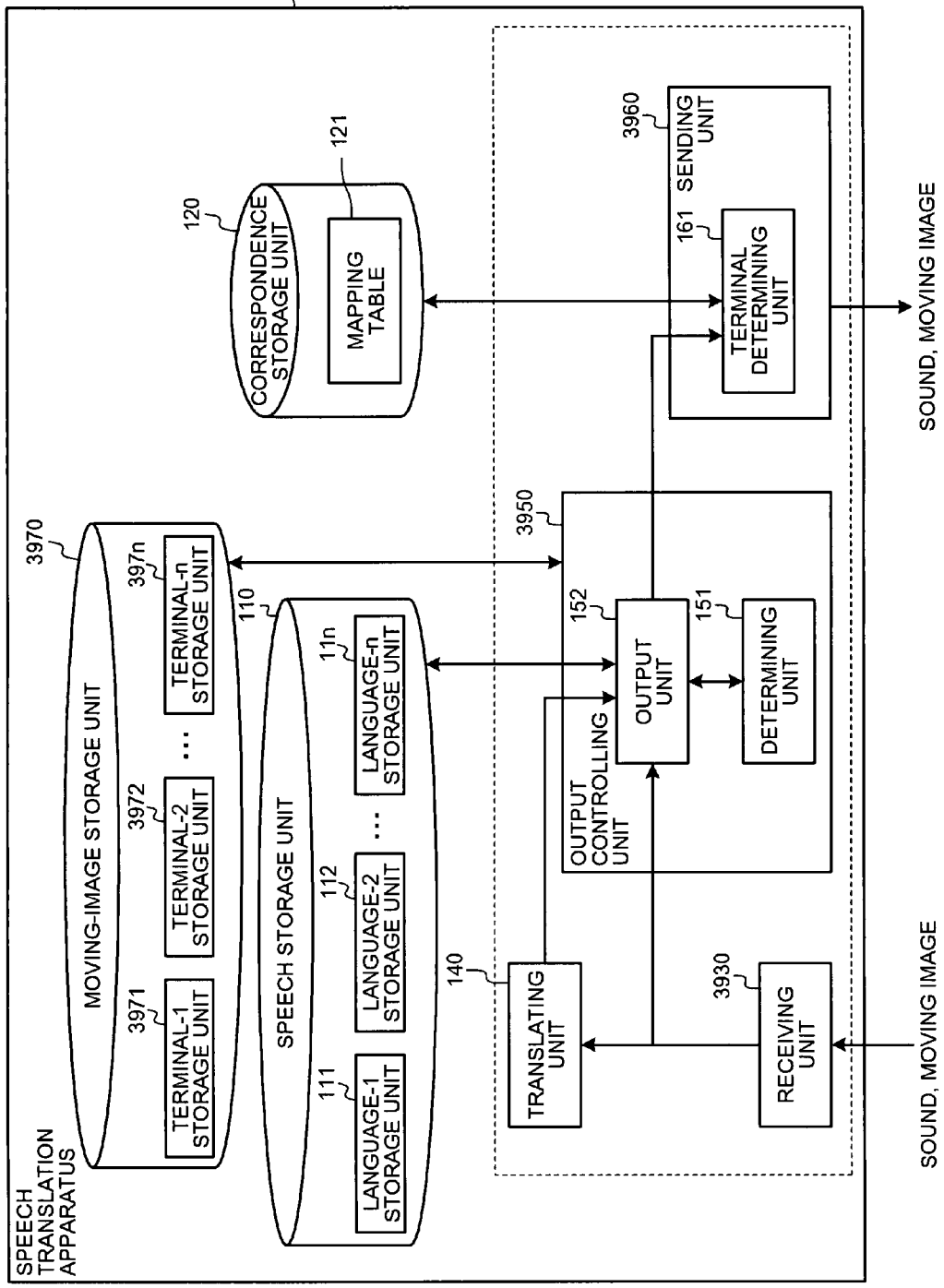
FIG. 39 is a block diagram of a speech translation apparatus according to the seventh embodiment.

As shown in FIG. 39, the speech translation apparatus 3900 includes the speech storage unit 110, the correspondence storage unit 120, a receiving unit 3930, the translating unit 140, an output controlling unit 3950, a sending unit 3960, and a moving-image storage unit 3970.

Compared with the speech translation apparatus 100 according to the first embodiment, the moving-image storage unit 3970 is added, and the functions of the receiving unit 3930, the output controlling unit 3950, and the sending unit 3960 are different from those in the speech translation apparatus 100. Because configurations and functions of other units are same as those in the speech translation apparatus 100 according to the first embodiment, the same numerals are used as shown in FIG. 3, and the explanation thereof is omitted.

The moving-image storage unit 3970 stores therein the moving image received from the terminals 3800. The moving-image storage unit 3970 includes storage subunits to store the moving images with respect to each terminal 3800, such as a terminal-1 storage unit 3971, a terminal-2 storage unit 3972, . . . , a terminal-n storage unit 397n, because the moving images do not depend on languages.

The receiving unit 3930 receives the moving image as well as the speech from each of the terminals 3800. The receiving unit 3930 transfers only the speech to the translating unit 140, and transfers both of the speech and the moving image to the output controlling unit 3950.

The output controlling unit 3950 receives the translated speech from the translating unit 140, and it receives the received speech and the moving image from the receiving unit 3930. The output controlling unit 3950 stores the moving image in the moving-image storage unit 3970. When the translated speech can be output, the output controlling unit 3950 acquires the speech and the moving image from the speech storage unit 110 and the moving-image storage unit 3970, and transfers them to the sending unit 3960.

The output controlling unit 3950 acquires the same length of the moving image as the speech duration to be output from the moving-image storage unit 3970. If there is any terminal 3800 that uses the same language as the source speech, the speech durations are to be output in the same order as the source speech. However, if the speech is output in a different language from the source speech, the speech can be output in order different from that of the source speech. However, the moving image with the same length as the speech to be output is output in the same order as the source speech.

If the output speech is longer than the received speech, the reproduction speed of the moving image is reduced. If the output speech is shorter than the received speech, the reproduction speed of the moving image is increased.

The sending unit 3960 associates the speech with the moving image, and sends them to the terminal 3800.

Figure 40:
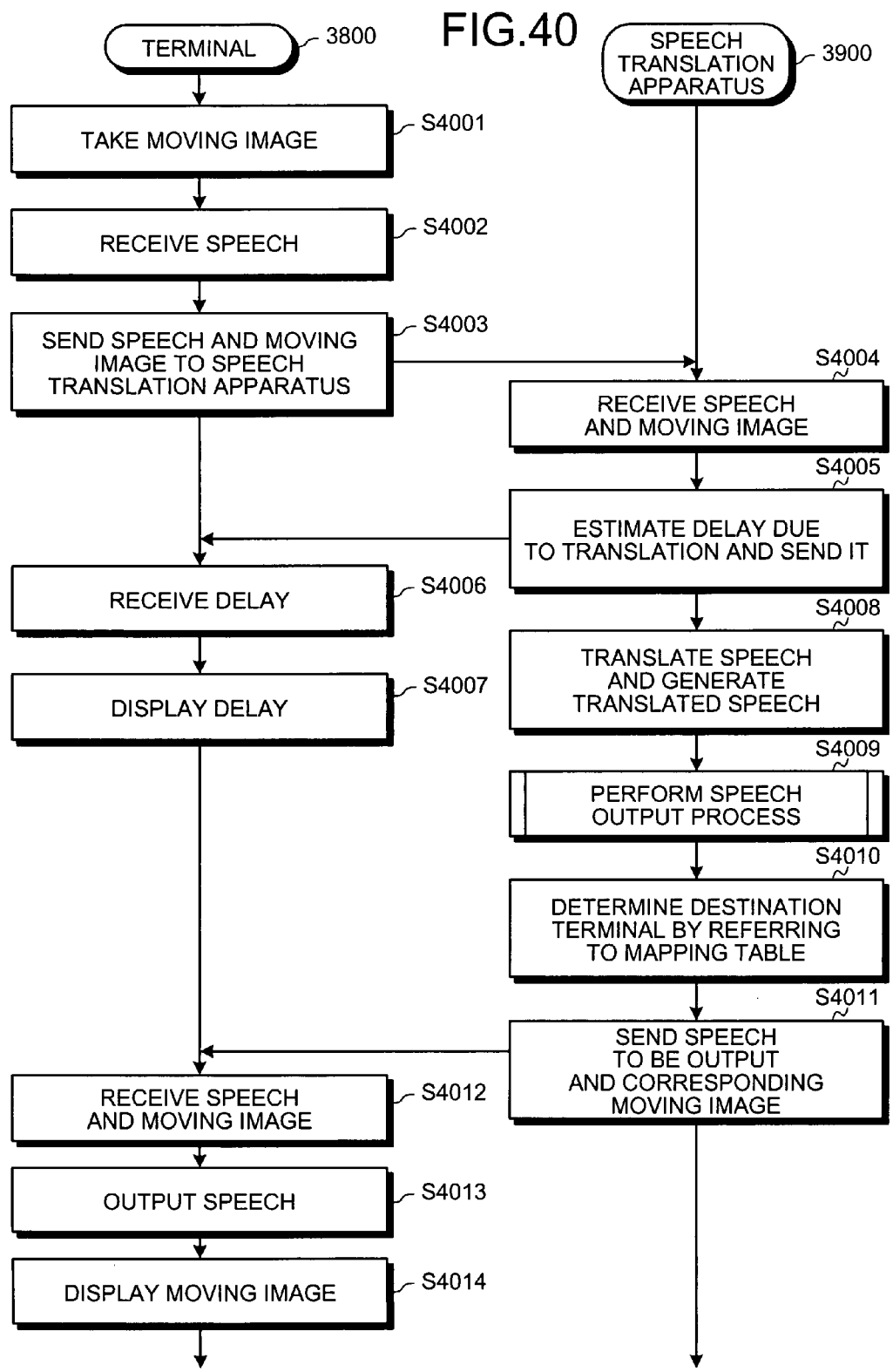
FIG. 40 is a sequence diagram of a speech translating process according to the seventh embodiment.

A speech translating process performed by the speech translation apparatus 3900 according to the seventh embodiment is explained referring to FIG. 40.

The imaging unit 3801 in the terminal 3800 takes a moving image (step S4001). Along with the speech input from the speech receiving unit 201 (step S4002), the sending unit 202 sends the moving image to the speech translation apparatus 3900 (step S4003).

The receiving unit 3930 in the speech translation apparatus 3900 receives the speech and the moving image (step S4004). The output controlling unit 3950 estimates the delay due to the translation and sends the delay to the terminal 3800 (step S4005).

The second receiving unit 3802 in the terminal 3800 receives the delay (step S4006), and the image display unit 3803 displays the delay on the screen (step S4007). A method of displaying the delay will be described later.

The speech translation apparatus 3900 performs the translating process, the speech output process, and the determining process in the same manner as the steps S604, S605, and S606 in the first embodiment (steps S4008, S4009, S4010).

The sending unit 3960 sends the speech to be output and the corresponding moving image to the terminal 3800 (step S4011).

The first receiving unit 203 in the terminal 3800 receives the speech and the moving image (step S4012). The speech output unit 204 outputs the speech (step S4013) and the image display unit 3803 displays the moving image (step S4014).

Figure 41:
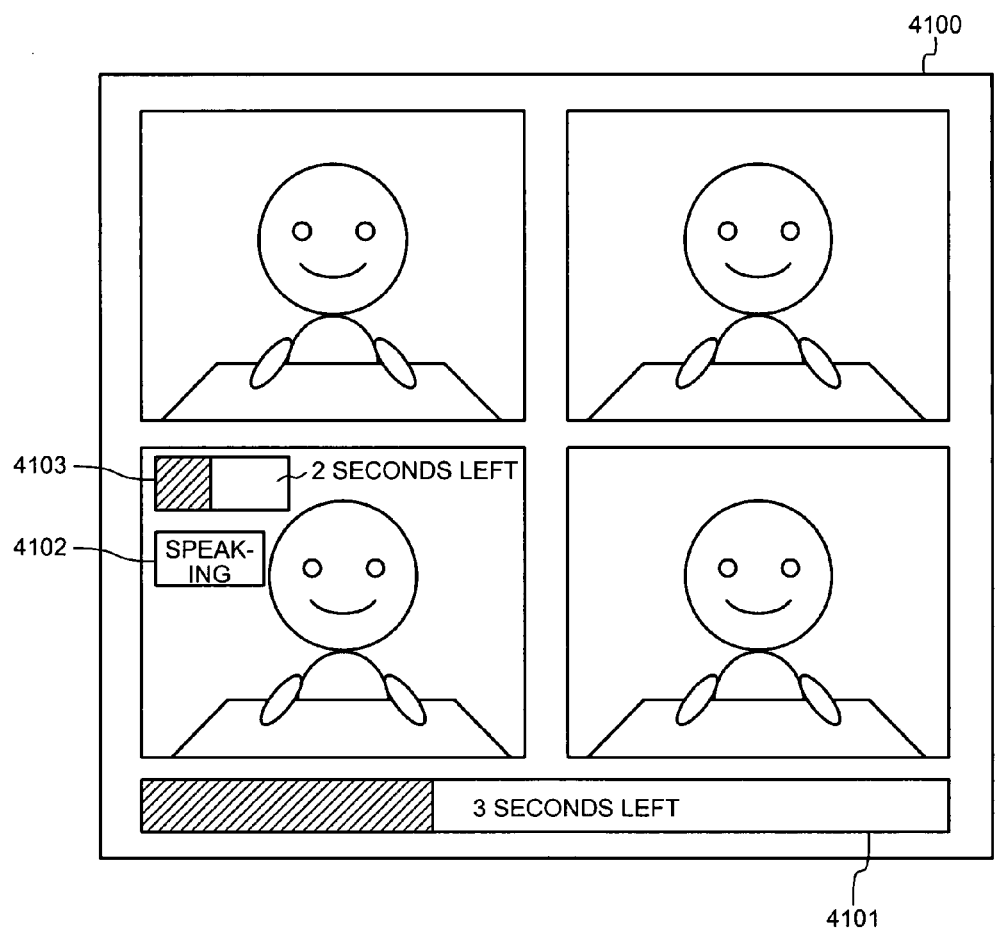
FIG. 41 is an explanatory diagram showing an example of a screen displayed on the terminal.

The method of displaying the delay is explained referring to FIG. 41.

A display screen 4100 includes a progress bar 4101, a display area 4102, and a progress bar 4103 in addition to four display areas that display a plurality of participants. The progress bar 4101 indicates progress in translating the speech spoken by the participant that uses the terminal 3800. The display area 4102 indicates that another participant is speaking. The progress bar 4103 indicates the progress in processing the speech spoken by the other participant.

The delay due to the speech translation can last for a few seconds to tens of seconds, and sometimes the conference cannot be conducted smoothly unless the participants understand the degree of the delay. For example, when the participant expects an answer, he/she cannot determine how long to wait for the answer. To prevent such a case, the progress bar 4101 is provided, which indicates the time until the speech is output to other participants. The progress of the process can be indicated in any other methods instead of the progress bar. For example, the time until completion of the process can be indicated in figures and counted down.

In the example shown in FIG. 41, five terminals 3800 are used. The user of the terminal 3800 shown in FIG. 41 is not displayed because it is not essential; however, the terminal 3800 can be configured to display the user thereof.

When the user of another terminal 3800 starts to speak, the display area 4102 indicates that he/she is speaking to alert other users. With the time until the speech is output, the users know how long they should wait.

An estimation of the delay is computed by the output controlling unit 3950 in the speech translation apparatus 3900 averaging delays in the past. Whether the user is speaking or not can be determined when a non-speech duration is changed to a speech duration or vice versa in the translating unit 140.

The speech translation apparatus 3900 can be configured to output the speech and the moving image with the predetermined delay as explained in the fifth and sixth embodiments.

To shorten the delay, it is necessary to shorten the reproduction time of the moving image as well as the speech. To shorten the reproduction time of the moving image, any existing method can be used such as eliminating inactive sections detected by a motion detection technology and shortening the moving image by thinning the image at a constant rate.

As described above, the speech translation apparatus 3900 according to the seventh embodiment exchanges the moving image along with the speech, and minimizes the time lag for the participants in a video conference system that uses moving images. Moreover, with the indication of the delay and the fact that a participant is speaking on the screen, the users know the progress of the process, and the conference can be conducted smoothly.

Figure 42:
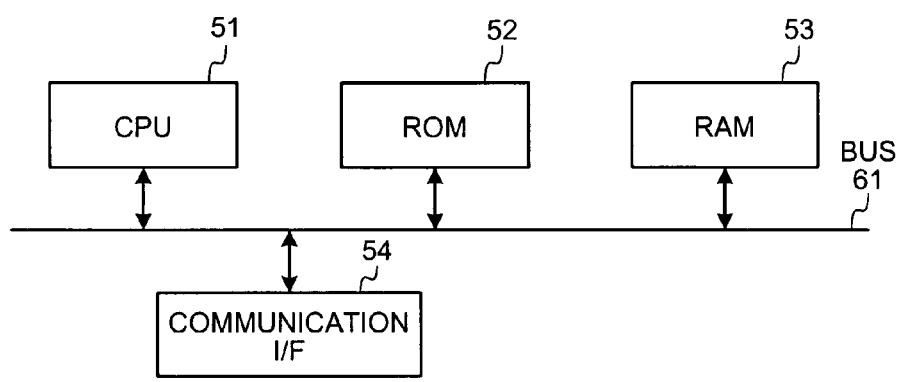
FIG. 42 is a block diagram of hardware in the speech translation apparatus according to any one of the first to the seventh embodiments.

As shown in FIG. 42, each of the speech translation apparatuses according to the first to the seventh embodiments includes a control device such as a central processing unit (CPU) 51, an internal storage device such as a read only memory (ROM) 52 and a RAM 53, a communication interface 54 connected to a network for communication, an external storage unit such as the HDD and a compact disc (CD) drive, a display device, an input device such as a keyboard and a mouse, and a bus 61 that connects the devices with one another, and uses a common computer.

A speech translation program executed in the speech translation apparatuses according to the first to the seventh embodiments is provided in a computer readable recording medium such as a compact disk read only memory (CD-ROM), a flexible disk (FD), a compact disk recordable (CD-R), and a digital versatile disk (DVD) in an installable or executable format.

Otherwise, the speech translation program can be stored in a computer connected to a network such as the Internet to be downloaded via the network. The speech translation program can be provided or distributed via the network such as the Internet.

The speech translation program can be preinstalled in the ROM 52 or the like.

The speech translation program includes modules of the receiving unit, the translating unit, the output controlling unit, the sending unit, and the like. The CPU 51 reads the speech translation program from the recording medium and executes it, whereby the units are loaded into a main storage device and generated therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech translation apparatus comprising:
a correspondence storage unit that stores identifiers to uniquely identify each of a plurality of terminals connectable via a network and usage languages used in the terminals associated with each other;
a receiving unit that receives a source speech from one of the terminals;
a translating unit that acquires the usage languages different from a source language used in the source speech from the correspondence storage unit, and generates a translated speech translated from the source speech by using each of the acquired usage languages as a target language;
a determining unit that determines whether the translated speech has been generated in all of the target languages when the translated speech is generated in any one of the target languages;
an output unit that outputs the translated speech when the translated speech has been generated in all of the target languages; and
a sending unit that sends the translated speech to each of the terminals identified by the identifier corresponding to the target language.

2. The apparatus according to claim 1, wherein
the output unit further outputs the source speech when the translated speech has been generated in all of the target languages, and
the sending unit sends the source speech to the terminal identified by the identifier corresponding to the source language.

3. The apparatus according to claim 1, wherein
the determining unit determines whether a first speech duration and a second speech duration of the translated language have been generated in all of the target languages, when the translated speech is generated in any one of the target languages, the first speech duration being a duration to be output next in one of the target languages and the second speech duration being a duration to be output in any other target language before an end of the first speech duration, and
the output unit outputs the translated speech and the source speech that correspond to the first speech duration and the second speech duration, when the first speech duration and a second speech duration of the translated speech have been generated in all of the target languages.

4. The apparatus according to claim 1, wherein the translating unit generates the translated speech a reproduction time of which lasts for a substantially same length of time as that in the target languages.

5. The apparatus according to claim 4, wherein the translating unit changes reproduction speed of the translated speech to make the length of the translated speech substantially same among a plurality of the target languages, when the reproduction time of the translated speech does not substantially same as that of the target languages.

6. The apparatus according to claim 4, wherein the translating unit adds a silent speech at least one of before and after the translated speech to make the reproduction time of the translated speech substantially same among a plurality of the target languages, when the reproduction time of the translated speech does not substantially same as that of the target languages.

7. The apparatus according to claim 1, further comprising a speech storage unit that is capable of storing a mixed speech obtained by mixing the translated speeches or the source speeches with respect to each target language, wherein
the output unit further mixes the mixed speech stored in the speech storage unit with an additional translated speech or another source speech with respect to each target language, stores the mixed speech mixed by the output unit in the speech storage unit, and outputs the mixed speech when the translated speech is generated in all of the target languages.

8. The apparatus according to claim 1, further comprising a speech storage unit that is capable of storing the translated speech or the source speech in each target language with respect to each terminal, wherein
the output unit stores the translated speech and the source speech in the speech storage units and outputs the translated speech and the source speech in the target languages acquired from the speech storage unit, when the translated speech has been generated in all of the target languages, and the sending unit sends a mixed speech including only the translated speeches to the terminal that sent the source speech, and sends a mixed speech including the translated speech and the source speech to other terminals.

9. The apparatus according to claim 1, further comprising a delay unit that computes a first difference by subtracting a second time point at which the source speech is received from a first time point at which the translated speech is determined to have been generated in all of the target languages, and delays output of the translated speech and the source speech until the first threshold time has passed since the second time point, when the computed first difference is less than a first threshold time determined in advance, wherein the output unit outputs the translated speech and the source speech after the delay unit delays the reproduction.

10. The apparatus according to claim 9, further comprising a shortening unit that shortens a reproduction time of the translated speech and the source speech by a length of a second difference computed by subtracting the first threshold time from the first difference, when the first difference is more than the first threshold time.

11. The apparatus according to claim 10, wherein the shortening unit shortens the reproduction time of the translated speech and the source speech by increasing a reproduction speed.

12. The apparatus according to claim 10, wherein the shortening unit detects at least one of a silence and a noise from each of the translated speech and the source speech and shortens the reproduction time of the translated speech and the source speech by eliminating the silence and the noise.

13. The apparatus according to claim 9, wherein the delay unit computes the first difference for each of a predetermined number of second speech durations of which the translated speech and the source speech have been output before a first speech duration of which the translated speech has been generated in all of the target languages, computes a product of an average of first differences and a predetermined coefficient, and delays reproduction of the first speech duration of the translated speech and the source speech until the first threshold time has passed since the second time point, when the product is less than the first difference.

14. The apparatus according to claim 13, wherein the delay unit computes the product using the predetermined number of the second speech durations of which the translated speech and the source speech have been output before the first speech duration, each of the second durations being more than a second threshold time determined in advance.

15. The apparatus according to claim 1, wherein
the receiving unit further receives an image associated with the source speech from the terminal, and
the sending unit sends the image further associated with the translated speech or the source speech.

16. The apparatus according to claim 15, wherein the translating unit generates the translated speech a reproduction time of which is substantially same as that in the source speech.

17. The apparatus according to claim 16, wherein the translating unit generates the translated speech a reproduction time of which is substantially same as that of the source speech by adding a silent speech at least one of before and after the translated speech, when the reproduction time of the translated speech is shorter than that of the source speech.

18. A speech translation apparatus comprising:
a correspondence storage unit that stores identifiers to uniquely identify each of a plurality of terminals connected via a network and usage languages used in the terminals associated with each other;
a receiving unit that receives a source speech from one of the terminals;
a translating unit that acquires the usage languages different from a source language used in the source speech from the correspondence storage unit, and generates a translated speech translated from the source speech by using each of the acquired usage languages as a target language;
a sending unit that sends the translated speech to each of the terminals identified by the identifier corresponding to the target language and sends the source speech to each of the terminals identified by the identifier corresponding to the source language;
a determining unit that determines whether the translated speech has been generated in all of the target languages, when the translated speech is generated in any one of the target languages; and
an output unit that outputs duration information of a speech duration of the source speech determined by the determining unit, when the translated speech has been generated in all of the target languages, wherein
the sending unit further sends the duration information to the terminals.

19. A speech translation apparatus comprising:
a language storage unit that stores usage languages;
a first receiving unit that receives a source speech from a plurality of other speech translation apparatuses connectable via a network;
a translating unit that generates a translated speech translated from the source speech by using each of the usage languages stored in the language storage unit as a target language;
a second receiving unit that receives information indicating that the source speech has been translated into a language used in another speech translation apparatus therefrom;
a determining unit that determines whether the translated speech has been generated in all of the other speech translation apparatuses, when the information is received from any one of the other speech translation apparatuses; and
an output unit that outputs the translated speech when the translated speech has been generated in all of the other speech translation apparatuses.

20. A speech translation method comprising:
receiving a source speech from a plurality of terminals connectable via a network;
acquiring the usage languages different from a source language used in the source speech from a correspondence storage unit that stores identifiers to uniquely identify each of a plurality of terminals and usage languages used in the terminals associated with each other;
generating a translated speech translated from the source speech by using each of the usage languages acquired as a target language;
determining whether the translated speech has been generated in all of the target languages when the translated speech is generated in any one of the target languages;
outputting the translated speech when it is determined that the translated speech has been generated in all of the target languages; and sending the translated speech to each of the terminals identified by the identifier corresponding to the target language.

21. A computer program product having a computer readable medium including programmed instructions for translating a source speech, wherein the instructions, when executed by a computer, cause the computer to perform:

receiving the source speech from a plurality of terminals connectable via a network;

acquiring the usage languages different from a source language used in the source speech from a correspondence storage unit that stores identifiers to uniquely identify each of a plurality of terminals and usage languages used in the terminals associated with each other;

generating a translated speech translated from the source speech by using each of the usage languages acquired as a target language;

determining whether the translated speech has been generated in all of the target languages when the translated speech is generated in any one of the target languages;

outputting the translated speech when it is determined that the translated speech has been generated in all of the target languages; and sending the translated speech to each of the terminals identified by the identifier corresponding to the target language.

* * * * *